US012655372B2

(12) United States Patent
Derossett et al.

(10) Patent No.: US 12,655,372 B2
(45) **Date of Patent: *Jun. 16, 2026**

(54) LAUNDRY TREATMENT CARTRIDGE

(71) Applicant: The Procter & Gamble Company, Cincinnati, OH (US)

(72) Inventors: Corey Elizabeth Derossett, Highland Heights, KY (US); Carlos Amador Zamarreno, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 707 days.

This patent is subject to a terminal disclaimer.

(21) Appl. No.: 18/076,877

(22) Filed: Dec. 7, 2022

(65) Prior Publication Data

US 2023/0340382 A1 Oct. 26, 2023

(30) Foreign Application Priority Data

Dec. 8, 2021 (EP) .................................... 21213036

(51) Int. Cl.
*C11D 1/83* (2006.01)
*C11D 3/00* (2006.01)
(Continued)

(52) U.S. Cl.
CPC .............. *C11D 17/046* (2013.01); *C11D 1/83* (2013.01); *C11D 3/0036* (2013.01); *C11D 3/042* (2013.01);
(Continued)

(58) Field of Classification Search
CPC ..... C11D 17/046; C11D 11/0017; C11D 1/83; C11D 3/0036
See application file for complete search history.

(56) References Cited

U.S. PATENT DOCUMENTS 10,913,832 B2 2/2021 Friedrich et al.
2004/0147423 A1* 7/2004 Scialla ............... C11D 17/0073 510/372
(Continued)

FOREIGN PATENT DOCUMENTS

EP 2566943 B1 9/2017
EP 4194536 A1 * 6/2023 ........... C11D 17/046
(Continued)

OTHER PUBLICATIONS

PCT Search Report and Written Opinion for PCT/US2022/079868 dated Nov. 15, 2022, 14 pages.
(Continued)

*Primary Examiner* — Mark Eashoo
*Assistant Examiner* — M. Reza Asdjodi
(74) *Attorney, Agent, or Firm* — Carolyn S. Powell; Gary J. Foose

(57) ABSTRACT

A laundry treatment cartridge that includes a first sub-container and a second sub-container. The first sub-container contains and first laundry treatment composition. The second sub-container contains a second laundry treatment composition that differs from the first laundry treatment composition. The first sub-container and second sub-container are unitarily fixed with the cartridge.

16 Claims, 6 Drawing Sheets

(51) Int. Cl.

| | |
|---|---|
| ***C11D 3/04*** | (2006.01) |
| ***C11D 3/386*** | (2006.01) |
| ***C11D 3/39*** | (2006.01) |
| ***C11D 3/42*** | (2006.01) |
| ***C11D 17/04*** | (2006.01) |
| *C11D 1/00* | (2006.01) |
| *C11D 1/75* | (2006.01) |

(52) U.S. Cl.

CPC ...... *C11D 3/38618* (2013.01); *C11D 3/38636* (2013.01); *C11D 3/3945* (2013.01); *C11D 3/42* (2013.01); *C11D 1/008* (2013.01); *C11D 1/75* (2013.01); *C11D 2111/12* (2024.01)

(56) References Cited

U.S. PATENT DOCUMENTS

| | | | | |
|---|---|---|---|---|
| 2007/0151040 | A1 | 7/2007 | Rohwer et al. | |
| 2016/0068784 | A1 | 3/2016 | Vinson et al. | |
| 2016/0090554 | A1 | 3/2016 | Wang et al. | |
| 2018/0037851 | A1* | 2/2018 | Somerville Roberts | C11D 17/043 |
| 2018/0119070 | A1 | 5/2018 | Miracle | |
| 2019/0136162 | A1* | 5/2019 | Cooke | C11D 3/38636 |
| 2019/0276782 | A1 | 9/2019 | Labeque et al. | |
| 2020/0283702 | A1* | 9/2020 | Wieland | C11D 3/1246 |
| 2022/0372688 | A1* | 11/2022 | Attar | D06F 39/028 |
| 2023/0250371 | A1* | 8/2023 | Amador Zamarreno | C11D 3/042 510/297 |
| 2023/0340382 | A1* | 10/2023 | Derossett | C11D 3/38618 |

FOREIGN PATENT DOCUMENTS

| | | | | |
|---|---|---|---|---|
| GB | 2500917 | A * | 10/2013 | C11D 17/046 |
| JP | 2024544901 | A * | 12/2024 | C11D 3/3945 |
| WO | WO-2021105919 | A1 * | 6/2021 | C11D 3/38627 |
| WO | 2021130707 | A1 | 7/2021 | |

OTHER PUBLICATIONS

Extended EP Search Report and Written Opinion for 21213036.3 dated May 24, 2022, 10 pages.

All Office Actions; U.S. Appl. No. 18/076,866, filed on Dec. 7, 2022.

Unpublished U.S. Appl. No. 18/076,866, filed Dec. 7, 2022, to Carlos Amador Zamarreno et al.

* cited by examiner

LAUNDRY TREATMENT CARTRIDGE

FIELD OF THE INVENTION

Laundry treatment cartridges including multiple sub-containers in which each sub-container contains a laundry treatment composition that differs from the others.

BACKGROUND OF THE INVENTION

Most households wash their own laundry. Households typically must launder multiple types of garments and household textiles. For example, a household may include family members having different ages, occupations, recreational interests, and preferences for different types of garments. Household textiles used within the household may have different cleaning needs. For example, bed sheets, blankets, table place mats, dish wash cloths, bath washcloths, bath towels, pot and pan holders, hand towels, dish towels, floor mats, and the like may be fabricated from different types and colors of fabric materials. Garments and household textiles may also be soiled with different materials ranging from, for example, discharges from a human body, earthen materials, food products, lubricants, grass stains, and the like.

The wide variety of soiling that occurs to garments and household textiles has created a demand for a wide variety of laundry treatment compositions to address each or certain combinations of treatment needs. For example, there are laundry treatment compositions designed for white garments and textiles, sport garments, synthetic garments and textiles, colored garments and textiles, stained garments and textiles, as well as other laundry treatment composition designed address one or more specific household needs.

Households do not typically have an abundance of storage space in which to store a wide variety of laundry treatment compositions, each of which may only be used for some loads of laundry, but not others. Moreover, many consumers do not wish to have to put so much effort into selecting the right laundry treatment composition or combination of laundry treatment compositions for the job to be done.

Laundry washing machines are becoming ever more sophisticated. Manufacturers have developed laundry washing machines in which the user engages individual containers of laundry treatment compositions with a laundry washing machine so that the laundry treatment composition is automatically dispensed into the tub. In one arrangement, one container of laundry cleaning composition and one container of laundry fabric softening composition are individually and independently engaged with the laundry washing machine. The user of the machine may provide inputs into the control system of the laundry washing machine, for example load size, color of articles, amount of mechanical energy applied, and whether fabric softener is desired. The laundry washing machine then dispenses a specific amount of laundry cleaning composition to the tub. Regardless of the user input, the same laundry cleaning composition is used for each load of laundry. That laundry cleaning composition is not specifically designed for the specific need of the consumer for a particular load of laundry. This limits the ability of the user to achieve the best performance from the laundry washing machine and may result in the user being disappointed with the laundry cleaning composition. Another impediment to user adoption of such systems is that the user may have to change out spent containers for replacement containers at different times, since the cleaning composition and fabric softening compositions may be consumed at different rates. Users may become frustrated with continually having to access the internals of the laundry washing machine to remove and replace one container and then finding out after one or more additional loads that the other container then needs removed and replaced.

With these limitations in mind, there is a continuing unaddressed need for a laundry treatment composition system that can provide the inputs for flexibly formulating a customized laundry treatment composition for use on a single load of laundry. Furthermore, there is a continuing unaddressed need for a laundry treatment composition system that is configured to reduce the frequency of the user having change out independently removable containers so that a desired laundry treatment composition is available for use.

SUMMARY OF THE INVENTION

A laundry treatment cartridge comprising: a first sub-container containing a first laundry treatment composition comprising: from about 20 wt % to about 30 wt % of a first anionic surfactant system; and from about 13 wt % to about 23 wt % of a first nonionic surfactant system; and a second sub-container containing a second laundry treatment composition comprising: from about 0.001 wt % to about 0.3 wt % enzyme; and from about 1 wt % to about 3 wt % soil release polymer; wherein said first sub-container and said second sub-container are positioned within said cartridge.

DETAILED DESCRIPTION OF THE INVENTION

Figure 1:
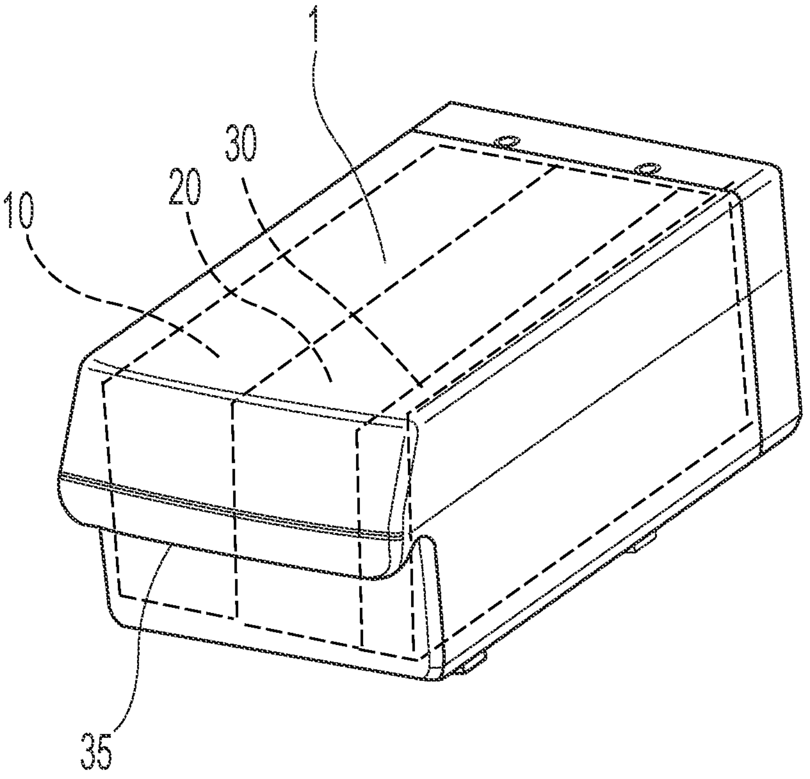
FIG. 1 is a laundry treatment cartridge.

A laundry treatment cartridge 1 is shown in FIG. 1. The laundry treatment cartridge 10 can comprise three sub-containers, each of which contain a laundry treatment composition that differs from the others. The laundry treatment composition within each sub-container can be uniquely formulated so that each laundry treatment composition can be particularly suited for certain types articles or wash conditions. Moreover, the laundry treatment compositions can be formulated so that even if a particular laundry composition that is most desirable for certain types of articles or wash conditions is unavailable or available in only a limited quantity, one or more of the other laundry treatment compositions or a combination thereof can provide for an acceptable level of laundry treatment. Each sub-container can also have the capacity to contain a unique volume of laundry treatment composition. The volume of each sub-container can be specified based on the expected user demand for each of the different laundry treatment compositions. This combination of different laundry treatment compositions provided in different volumes within a single cartridge can provide for a convenient, flexible, and efficient way for users to provide multiple laundry treatment compositions to an automatic clothing washing machine.

The laundry treatment cartridge 1 can comprise a first sub-container 10, a second sub-container 20, and an optional third sub-container 30. The first sub-container 10, second sub-container 20, and optional third sub-container 30 can be unitarily fixed within or to the laundry treatment cartridge 1. That is, the first sub-container 10, second sub-container 20, and optional third sub-container 30 are engaged with one another and with the laundry treatment cartridge 1 so that when the cartridge 1 is moved, each of the first sub-container 10, second sub-container 20, and optional third sub-container 30 move in conjunction with one another. Unitarily fixing the first sub-container 10, second sub-container 20, and optional third sub-container 30 renders the sub-containers to not be removable from the laundry treatment cartridge 1 without the assistance of a tool. Sub-containers that are unitarily fixed within or to the laundry treatment cartridge are not independently exchangeable without the use of a tool. That is, when the user removes one of the sub-containers from the laundry treatment apparatus all of the sub-containers with the laundry treatment cartridge 1 are removed from the laundry treatment apparatus. The cartridge front 40 of the laundry treatment cartridge 1 can comprise a grip 35 by which the user can push and pull on to insert and remove the laundry treatment cartridge 1 from the laundry treatment apparatus.

Figure 2:
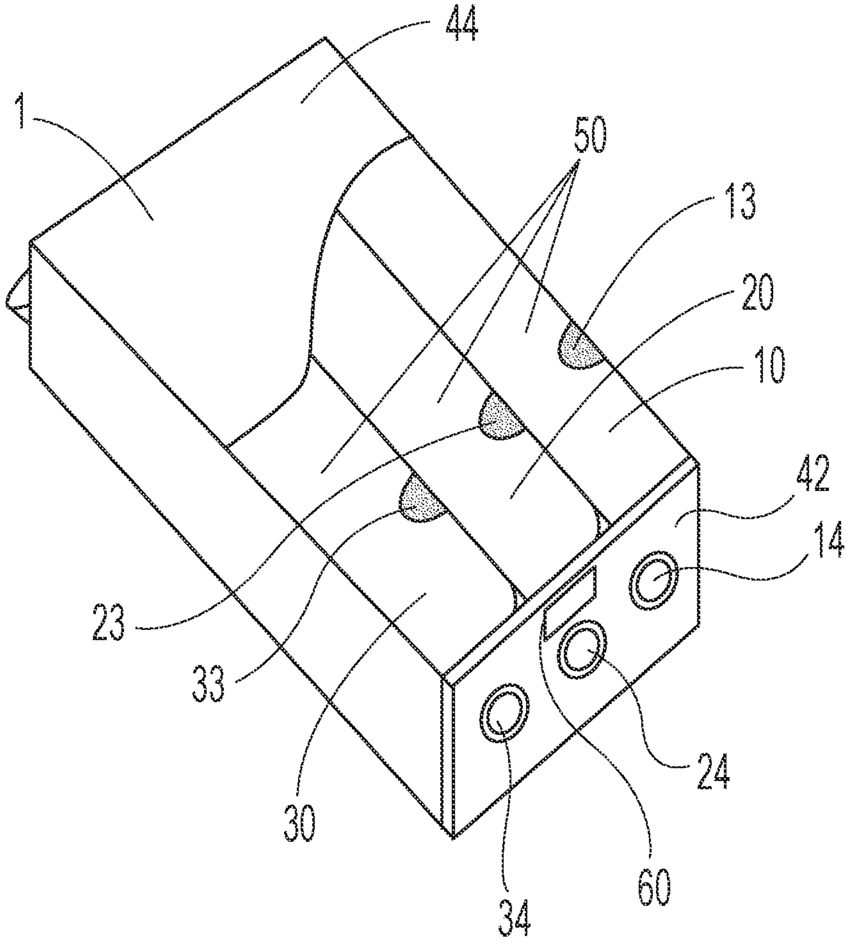
FIG. 2 is a partial view of laundry treatment cartridge with the cartridge rear oriented towards the viewer.

A partial view of laundry treatment cartridge 1 with the cartridge rear 42 oriented towards the viewer is shown in FIG. 2. A portion of the cartridge top 44 is removed so that the first sub-container shell 11, second sub-container shell 21, and optional third sub-container shell 31 are visible. Portions of the first sub-container shell 11, second sub-container shell 21, and optional third sub-container shell 31, are also removed. The first sub-container 10 can contain a first laundry treatment composition 13. The second sub-container 20 can contain a second laundry treatment composition 23. The optional third sub-container 30 can contain a third laundry treatment composition 33.

Each of the sub-containers can be a collapsible bag 50. Each sub-container shell can hold a separate collapsible bag 50. Together a sub-container shell and the collapsible bag 50 associated therewith form a system that can function in the same manner as a bag-in-box container or a bag-in-bottle container. The sub-container shells support the collapsible bag 50 associated therewith from the time the collapsible bag 50 is filled until the contents of the flexible bag 50 are dispensed. The shells can be a complete enclosure, partial enclosure, or an open frame supporting the respective collapsible bag 50. The shells may be made of plastic, paper board, corrugate cardboard, metal, or other rigid material.

The first sub-container 10 can have a first sub-container outlet 14. The second sub-container 20 can have a second sub-container outlet 24. The optional third sub-container 30 can have an optional third sub-container outlet 34. Each of these outlets is in fluid communication with the interior volume of the respective sub-container and is part of the respective sub-container. These outlets are the path through which laundry treatment compositions are transported to downstream components of the laundry treatment apparatus. The first sub-container outlet 14 can be engaged with the first sub-container shell 11. Likewise, the second sub-container outlet 24 can be engaged with the second sub-container shell 21. And the optional third sub-container outlet 34 can be engaged with the optional third sub-container shell 31. Mounting the collapsible bags 50 within a shell can help maintain the proper relative positions of the sub-container outlets so that the sub-container outlets may be conveniently and securely engaged with the laundry treatment apparatus. Together, the laundry treatment cartridge 1, which contains the sub-container shells, which each hold a sub-container form part of the refill system for a laundry treatment apparatus.

The first sub-container outlet 14, second sub-container outlet 24, and optional third sub-container outlet 34 can be oriented in the same direction and spaced apart from one another. Such an arrangement can be convenient for the user to engage all of the sub-containers with the laundry treatment apparatus at the same time in one movement. Moreover, the spaced apart sub-container outlets can provide for independent discharge from each of the sub-containers. This may be advantageous over an arrangement in which each sub-containers is in fluid communication with a single master outlet of the laundry treatment cartridge 1. Combining flow from multiple sub-containers or having flow from multiple sub-containers pass through the same master outlet can result in problems with mixing, cross contamination, degradation, and compatibility amongst the laundry treatment compositions contained in the sub-containers. Independently controlled discharge from each sub-container can be routed to a flushing chamber that is part of the laundry treatment apparatus. The flushing chamber can be sufficiently self-cleaning so as to limit problems with cross contamination, degradation, and compatibility of and amongst the laundry treatment compositions. Furthermore, discharge from each of the sub-containers can be individually controlled so that discharge can be provided from only one sub-container or multiple sub-containers at the same time and the time at which discharge occurs can be controlled.

The collapsible bag 50 can be a multi-layer film, metalized polyester, EVOH, or polyethylene bag (LLPDE, MLDPE, HDPE), nylon LLDPE laminate or coextrusion, foil laminate or other suitable material from which liquid can be drawn. As laundry treatment composition is dispensed from each collapsible bag 50, the collapsible bag 50 collapses. A collapsible bag 50 overcomes a weakness of rigid containers in that when liquid is dispensed from a rigid container the container must be vented. Providing venting to a rigid container can be done via a vent in the body of the rigid container or via a vent associated with the outlet of the container. Vents in rigid containers may be passive, i.e. the user does not have to do anything to make the vent operable or operate, or may be active and require the user to activate such vent. Extra components associated with venting, which may add significant cost to the container, and the potential for the user to have to activate the vent make such a dispensing system non-optimal.

The laundry treatment cartridge 1 can include a printed circuit board (PCB) connector 60. The PCB connector 60 can connect non-volatile memory (also referred to as flash or NVM) that is on a printed circuit board that resides on the laundry treatment cartridge 1 to a laundry treatment apparatus controller PCB that is part of the laundry treatment apparatus, which controls the dosing system. The non-volatile memory on the laundry treatment cartridge 1 can store information indicative of the number of doses used, number of doses remaining, quantity of composition dispensed from, and quantity of composition remaining in the laundry treatment cartridge 1 or one or more of the sub-containers of the laundry treatment cartridge 1. The non-volatile memory on the laundry treatment cartridge 1 can store information that uniquely identifies the laundry treatment cartridge 1 and can be retrieved by the laundry treatment apparatus.

The laundry treatment apparatus controller may read from the printed circuit board residing on the laundry treatment cartridge 1 information on the number of doses consumed from or remaining in the laundry treatment cartridge. The laundry treatment apparatus controller may contain instructions to report to a seller of the laundry treatment cartridge 1 information on the use of the laundry treatment apparatus or laundry treatment cartridge 1 or information to place an order for a replacement laundry treatment cartridge 1 to be sent to the user. Optionally, the laundry treatment apparatus controller may inform the user via an indicia associated with the laundry treatment apparatus, for example a light, message on a digital display, or audial signal, or a message to a mobile device associated with the user that a replacement laundry treatment cartridge is being ordered automatically or should be ordered by the user. For example, the number of uses or number of uses remaining within a laundry treatment cartridge 1 can be reported. A unique identifier may be provided in the printed circuit board residing on the laundry treatment cartridge 1 and the laundry treatment apparatus controller may report information about installation and removal of particular laundry treatment cartridges 1. The laundry treatment apparatus controller may also be reprogrammable to accommodate changes to operating algorithms for the laundry treatment apparatus. In particular, the laundry treatment algorithms may be reprogrammed to accommodate changes to the formulation of a laundry treatment composition within the laundry treatment cartridge 1. Changes in the laundry treatment compositions that might occur include changes in levels or activity of constituent materials of a laundry treatment composition or additions, substitutions, or removal of constituent materials of a laundry treatment composition. Optionally laundry treatment algorithms may be stored on the printed circuit board residing on the laundry treatment cartridge 1 and the laundry treatment apparatus controller may receive instructions therefrom and implement the instructions to operate the laundry treatment apparatus. The laundry treatment algorithms may include instructions for selecting which and how much of a particular laundry treatment composition is used from the laundry treatment cartridge 1 at a particular step in the laundry treatment process.

The PCB connector 60 can be mounted to one of the shells or some other part of the laundry treatment cartridge 1. The laundry treatment cartridge 1 can have a plurality of PCB connectors 60 serving various purposes such as conveying information from the laundry treatment cartridge 1 to the laundry treatment apparatus or receiving information from the laundry treatment apparatus to the laundry treatment cartridge. The PCB connector 60 can be connected to a computer chip having non-volatile memory or flash memory. For example, conveyed information may include authentication information, information on the volume of the laundry treatment compositions available, information on expiration date of the laundry treatment compositions, information on chain of custody of the laundry treatment cartridge, and the like. The laundry treatment cartridge 1 may receive information from the laundry treatment apparatus such as demand history for the laundry treatment composition or performance data from the laundry treatment apparatus and that information can be conveyed back to the entity that refills and services the laundry treatment cartridge 1.

Each of the collapsible bags 50 has a respective outlet and each outlet comprises an outlet valve. Each respective outlet valve is in fluid communication with the interior of the respective collapsible bag 50. The outlet valve can be a quick connect and release type valve that is and remains in a closed position unless the outlet is engaged with a complementary socket. When the respective outlet is engaged with a socket, the outlet valve is opened and a leak tight connection is formed between the outlet and the socket. When the respective outlet is disengaged from the socket, the outlet valve is closed.

Figure 3:
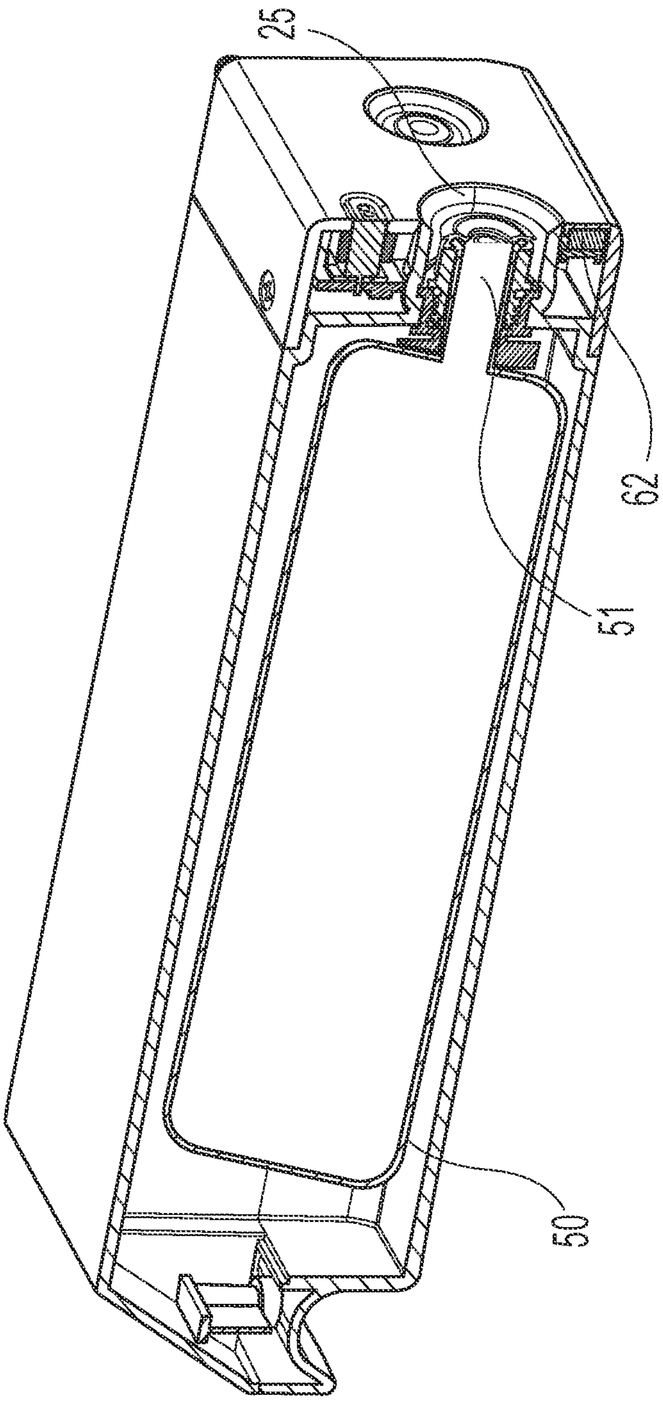
FIG. 3 is a cross section of a second sub-container shell, second sub-container, and second sub-container outlet.

A cross section of a second sub-container shell 21, second sub-container 20, and second sub-container outlet 24 is shown in FIG. 3. As shown in FIG. 3, the second sub-container 20 can be housed in the second sub-container shell 21. The second sub-container outlet valve 51 is in the closed position in FIG. 3. The second sub-container shell 21 can have a chamfered surface 25 around or partially around the second sub-container outlet 24. The chamfered surface 25 can assist the user with guiding engagement of the second sub-container outlet 24 and the socket of the laundry treatment apparatus for receiving the second sub-container outlet 24.

One or more of the sub-container shells can comprise a magnet 62. The magnet 62 can be attracted to a magnet that is part of the laundry treatment apparatus. When the user inserts the laundry treatment cartridge 1 into the laundry treatment apparatus, a tactile sensation is perceived by the user that indicates that the laundry treatment cartridge 1 is correctly fitted to the laundry treatment apparatus. The magnet 62 can also help to restrain movement of the laundry treatment cartridge 1 once it is inserted into the laundry treatment apparatus.

The first sub-container 10 can have a first volume, second sub-container 20 can have a second volume, and the optional third sub-container 30 can have a third volume. The volume of each of the sub-containers can be fixed based on the laundry treatment composition that is contained in the respective sub-container. The volume of each of the sub-containers can be the same as the others. Optionally, one, two, three, or more of the sub-containers can have a volume that is unique from some or all of the other sub-containers.

Figure 4:
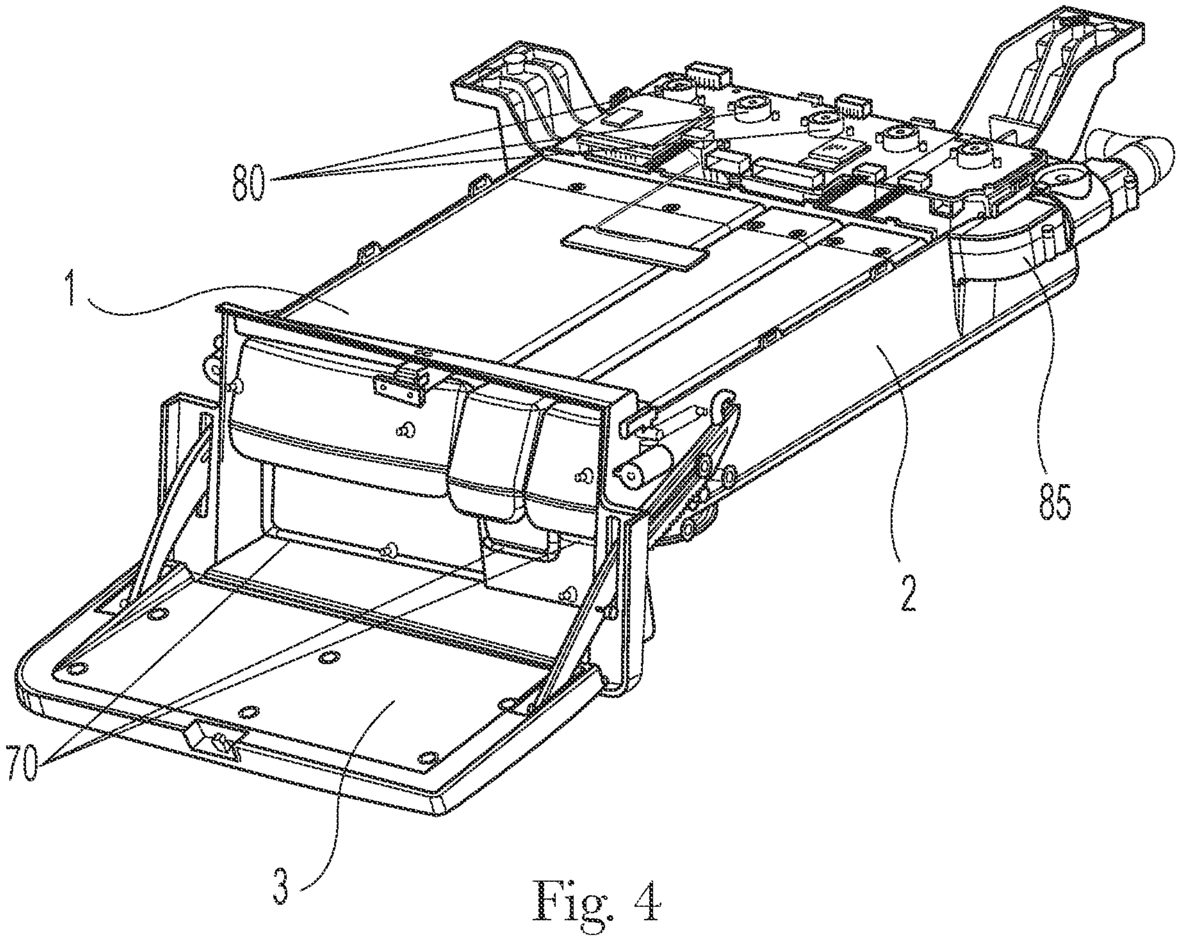
FIG. 4 is a liquid delivery system that is part of a laundry treatment apparatus.

The laundry treatment cartridge 1 can fitted to a liquid delivery system 2 that forms part of a laundry treatment apparatus (FIG. 4). The liquid delivery system 2 can comprise a plurality of receptacles 70 for receiving one or more cartridges that supply liquids to the laundry treatment apparatus. The receptacles 70 are volumes of space sized and dimensioned to accommodate a cartridge sized and dimensioned to fit within the receptacle.

The liquid delivery system 2 shown in FIG. 4 has three receptacles 70. The receptacle 70 in the left of FIG. 4 receives the laundry treatment cartridge 1. The other two receptacles 70 can receive other laundry treatment cartridges that contain other compositions that may be useful in a laundry treatment process. As described herein, the laundry treatment cartridge 1 contains compositions useful as part of the wash cycle of the laundry treatment apparatus. The other laundry treatment compositions may contain compositions useful as part of the rinse cycle, such as rinse added fabric softener, rinse added perfume composition, rinse added static control composition, and the like.

The laundry treatment cartridge 1 can be a drawer that the user installs in the laundry treatment apparatus. The first sub-container 10, second sub-container 20, and optional third sub-container 30, can be within or otherwise integral with the laundry treatment cartridge 1. The user can obtain the laundry treatment cartridge 1 from a retail or on-line establishment or from an entity that supplies a replacement laundry treatment cartridge 1 to the user when needed, for example by way of a subscription service. When the user possesses the laundry treatment cartridge 1, the user can simply install the laundry treatment cartridge 1 into the receptacle 70 that is sized and dimensioned to receive the laundry treatment cartridge 1.

When the user installs the laundry treatment cartridge 1, the outlet valves 51 associated with the first sub-container outlet 14, second sub-container outlet 24, and optional third sub-container outlet 34 can be engaged with individual sockets of the liquid delivery system 2. The user can then close an optional door. Each of the first sub-container outlet 14, the second sub-container outlet 24, and optional third sub-container outlet can have an individual outlet valve 51 associated therewith.

When the laundry treatment cartridge 1 is installed, the first sub-container 10, second sub-container 20, and optional third sub-container 30 are in fluid communication with the laundry treatment apparatus. The liquid deliver system 2 can comprise a plurality of pumps 80, each of which is in fluid communication with a socket which is in turn in fluid communication with an outlet valve 51 of a particular sub-container. Each of the pumps 80 can extract laundry treatment composition from a sub-container. Each of the pumps 80 can pump the extracted laundry treatment composition into a manifold 85. Water can be routed through the manifold 85 to mix with and transport the laundry treatment composition to the tub of the laundry treatment apparatus.

The pumps 80 can be selected from peristaltic pumps, piston pumps, gear pumps, and combinations thereof. The pumps 80 can be positive displacement pumps. The pumps 80 can be individually or in combination selected from a peristaltic pump, a piston pump, a gear pump, or other positive displacement pump.

The laundry treatment apparatus can have an electronic or mechanical controller that controls operation of the laundry treatment apparatus. The controller may selectively start and stop one or more of the pumps 80 to transport the desired laundry treatment composition to the manifold 85.

Figure 5:
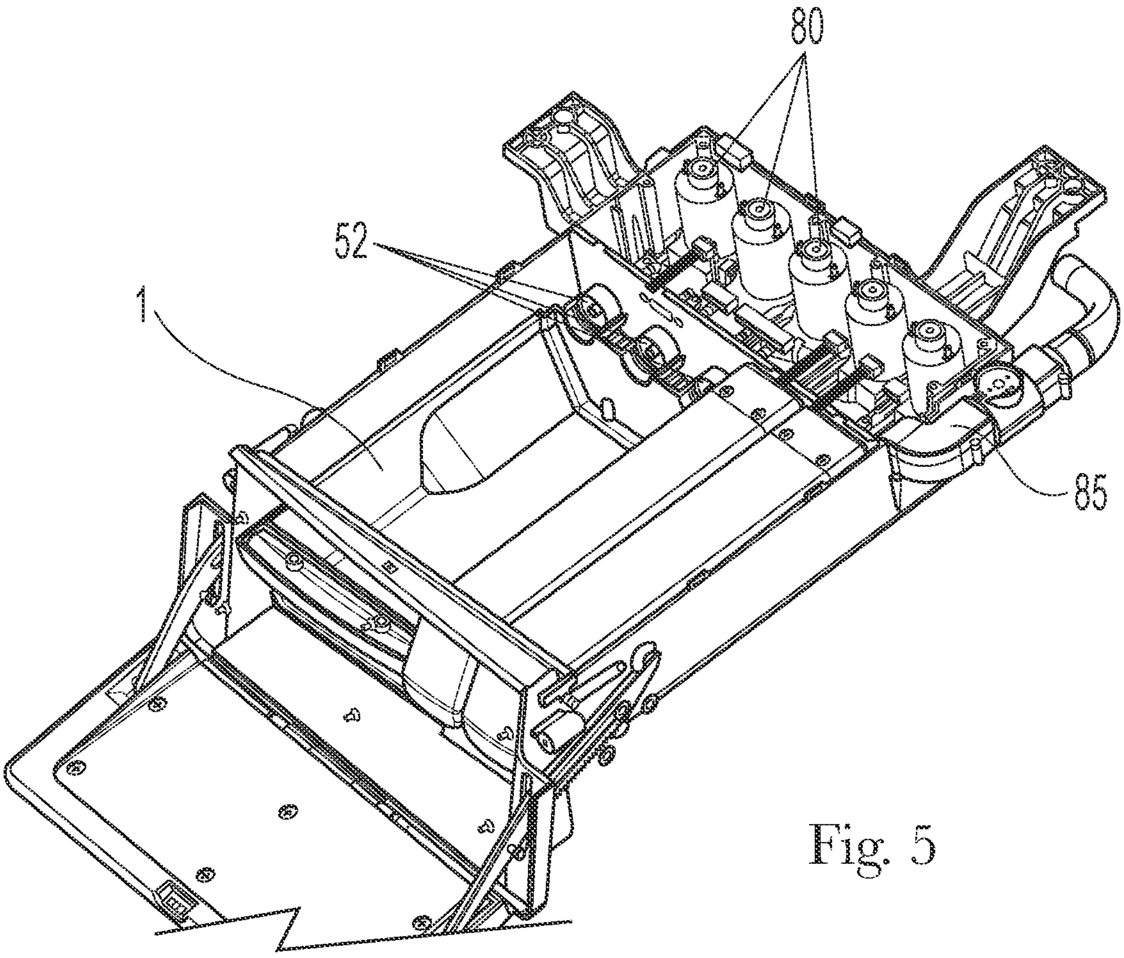
FIG. 5 is a cutaway view in which the sockets are shown and a nonlimiting example of a configuration of the pumps.

FIG. 5 is a cutaway view in which the sockets 52 are shown and a nonlimiting example of a configuration of the pumps.

Figure 6:
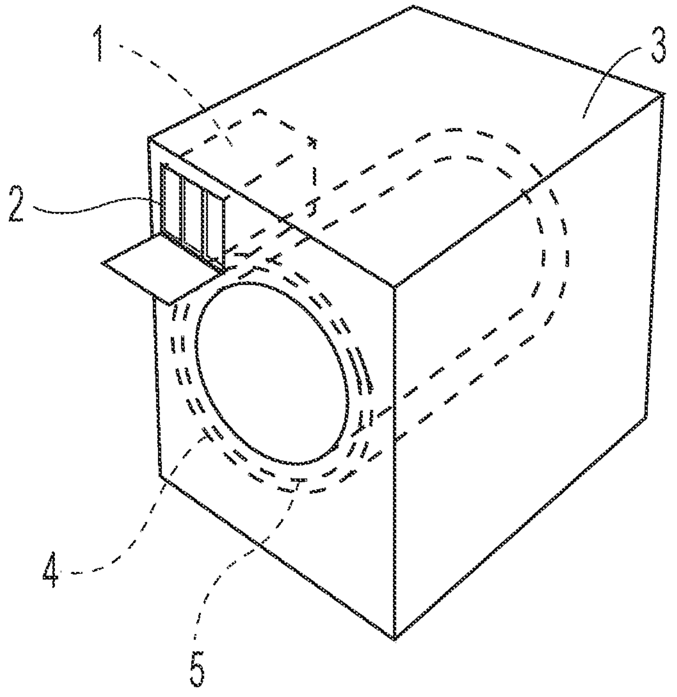
FIG. 6 is a laundry treatment apparatus.

The liquid delivery system 2 can be part of the laundry treatment apparatus 3 (FIG. 6). The laundry treatment apparatus 3. The laundry treatment apparatus 3 can comprise a liquid containment tub 4 in which a rotatable porous drum 5 is housed. The laundry treatment apparatus 3 can comprise a door that provides access to the interior of the drum 5. The laundry treatment apparatus 3 can be a top loading or front loading clothing washing machine.

The first sub-container 10 can have a first volume. The second sub-container 20 can have a second volume. The optional third sub-container 30 can have a third volume. The third volume can be less than the first volume and the third volume can be less than the second volume. As described herein the optional third sub-container 30 can contain a third laundry treatment composition 33. The third laundry treatment composition 33 can comprise a bleaching composition, as further described below. Bleach compositions can be formulated so that a small quantity of bleach composition can provide for a large bleaching capability. That is, the bleach composition can be a powerful bleach composition. As such, it can be practical for the laundry treatment cartridge 1 to comprise an optional third sub-container 10 having a volume less than each of the first sub-container 10 and second sub-container 20. The third volume can be less than about 60% of the first volume and second volume, individually. Such an arrangement can help to minimize the size of the laundry treatment cartridge 1, which can make shipping the laundry treatment cartridge 1 more economical and can help reduce the required size of the laundry treatment apparatus 3. The first volume can be from about 300 to about 900 mL. The second volume can be from about 300 mL to about 900 mL. The third volume can be from about 100 mL to about 400 mL.

Balanced Cleaning Approach

The laundry treatment cartridge 1 can comprise a first sub-container 10, a second sub-container 20, and optional third sub-container 30. The first sub-container 10 can contain a first laundry treatment composition 13. The first laundry treatment composition 13 can comprise from about 15 wt % to about 25 wt % of a first anionic surfactant system and from about 0 wt % to about 15 wt % of a first nonionic surfactant system. Optionally, the first laundry treatment composition 13 can comprise from about 15 wt % to about 25 wt % of a first anionic surfactant system and from about 5 wt % to about 15 wt % of a first nonionic surfactant system. The first anionic surfactant system and the first nonionic surfactant system can be provided at a weight ratio of the first anionic surfactant system to the first nonionic surfactant system from about 1.5 to about 4.

The second sub-container 20 can contain a second laundry treatment composition 23. The second laundry treatment composition 23 can comprise from about 0 wt % to about 5 wt % a second anionic surfactant system and from about 10 wt % to about 20 wt % a second nonionic surfactant system. The second nonionic surfactant system and the second anionic surfactant system can be provided at a weight ratio of the second nonionic surfactant system to the second anionic surfactant system greater than about 5. The nonionic surfactant provided in this second laundry treatment composition 23 can be beneficial for cleaning body soils. The optional third sub-container 30 can contain a third laundry treatment composition 33. The third laundry treatment composition 33 can comprise from about 8 wt % to about 20 wt % phthalimidoperoxycaproic acid and from about 0 wt % to about 0.05 wt % hydrochloric acid or equivalent. The third laundry treatment composition 33 can comprise about 0.025 wt % hydrochloric acid or equivalent. The third laundry treatment composition 33 can have a pH from about 2 to about 7, optionally about 3 to about 5, optionally about 4. The third laundry treatment composition 33 can comprise hydrochloric acid or equivalent to provide for a pH from about 2 to about 7.

The first laundry treatment composition 13 can have a proportionally higher range of weight fraction of nonionic surfactant than the second laundry treatment composition 23. As such, the first laundry treatment composition 13 above may be more suitable for loads of laundry that have fabrics that have greasy food stains than the second laundry treatment composition 23. The second laundry treatment composition 23 has a proportionally higher range of weight fraction of anionic surfactant than the first laundry treatment composition 13. As such, the second laundry treatment composition 23 above may be more suitable for loads of laundry that have body soils, such as bedding and towels, than the first laundry treatment composition 13. The third laundry treatment composition 33 may provide a benefit for loads of laundry that include whites.

Optionally the first laundry treatment composition 13 can comprise from 0.5 wt % to about 2 wt % of a first amine oxide system and the second laundry treatment composition 23 can comprise from about 1 wt % to about 3 wt % of a second amine oxide system. An amine oxide system can be beneficial for removing greasy stains.

Optionally, the second nonionic surfactant system and the second amine oxide system can be provided at a ratio of the second nonionic surfactant system to the second amine oxide system from about 3.33 to about 20.

Optionally, at least one of the first laundry treatment composition 13 and the second laundry treatment composition 13 can further comprises at least one of from about 0.5 wt % to about 1.5 wt % soil release polymer, from about 0.1 wt % to about 0.5 wt % alkoxylated polyamine, from about 1 wt % to about 2 wt % chelant, from about 1 wt % to about 2 wt % organic acid, from about 0.5 wt % to about 1.5 wt % boron compound, from about 0.0025 wt % to about 0.015 wt % amylase, from about 0.0005 wt % to about 0.01 wt % mannanase, from about 0.0005 wt % to about 0.01 wt % pectinase, and mixtures thereof.

The first sub-container 10 can contain a first volume of the first laundry treatment composition 13, the second sub-container 20 can contain a second volume of the second laundry treatment composition 23, and the optional third sub-container 30 can contain a third volume of the third laundry treatment composition. The third volume can be less than the first volume and the second volume. Optionally, the third volume can be less than about 60% of the first volume and the second volume. The first volume can optionally be from about 300 to about 900 mL. The second volume can optionally be from about 300 to about 900 mL. The third volume can optionally be from about 100 ml to about 400 mL. In general, it is thought that the third laundry treatment composition 33 might be used less frequently than the first laundry treatment composition 13 and second laundry treatment composition 23. Moreover, the aforesaid range in volume of the third treatment composition 33 may be sufficient to provide the user with a one month supply of the third laundry treatment composition 33.

In operation, the laundry treatment apparatus can selectively dispense from the laundry treatment cartridge 1 the first laundry treatment composition 13, the second laundry treatment composition 23, the third laundry treatment composition 33, and combinations thereof, to treat a single load of laundry. Such an approach can allow the laundry treatment apparatus to employ only one of the laundry treatment compositions to treat a load of laundry. Moreover, combinations of two or more of the laundry treatment composition at a potentially infinite number of levels relative to one another can be delivered into the laundry treatment apparatus to treat a load of laundry for which the combination and relative levels thereof is specially chosen for the load of laundry being treated and operating parameters of the laundry treatment apparatus.

Balanced Cleaning and Stain Removal

The laundry treatment cartridge 1 can comprise a first sub-container 10, a second sub-container 20, and optional third sub-container 30. The first sub-container 10 can contain a first laundry treatment composition 13. The first laundry treatment composition 13 can comprise from about 20 wt % to about 30 wt % of a first anionic surfactant system and from about 13 wt % to about 23 wt % of a first nonionic surfactant system.

The second sub-container 20 can contain a second laundry treatment composition 23. The second laundry treatment composition 23 can comprise from about 0.001 wt % to about 0.3 wt % enzyme and from about 1 wt % to about 3 wt % soil release polymer.

The optional third sub-container 30 can contain a third laundry treatment composition 33. The third laundry treatment composition 33 can comprise from about 8 wt % to about 20 wt % phthalimidoperoxycaproic acid and from about 0 wt % to about 0.05 wt % hydrochloric acid or equivalent. The third laundry treatment composition 33 can comprise about 0.025 wt % hydrochloric acid or equivalent. The third laundry treatment composition 33 can have a pH from about 2 to about 7, optionally about 3 to about 5, optionally about 4. The third laundry treatment composition 33 can comprise hydrochloric acid or equivalent to provide for a pH from about 2 to about 7.

The second laundry treatment composition 23 can have a proportionally higher range of weight fraction of enzyme and soil release polymer than the first laundry treatment composition 13. As such, the second laundry treatment composition 23 above may be more suitable for loads of laundry in which a low amount of mechanical agitation is applied or whiteness is a desired benefit than the first laundry treatment composition 13. The third laundry treatment composition 33 may provide a benefit for loads of laundry that include whites. The first anionic surfactant system and first nonionic surfactant system of the first laundry treatment composition described above can also provide for good efficiency of cleaning a broad range of grease stains and body soil stains. The third laundry treatment composition 33 above can provide for reducing malodor, whiteness, and bleaching of colored stains. Optionally the first laundry treatment composition 13 can comprise from 1 wt % to about 3 wt % of a first amine oxide system and the second laundry treatment composition 23 can comprise from about 1 wt % to about 3 wt % of a second amine oxide system. An amine oxide system can be beneficial for removing greasy stains.

Optionally, at least one of said first laundry treatment composition and said second laundry treatment composition further comprise at least one of from about 0.5 wt % to about 1.5 wt % soil release polymer, from about 0.1 wt % to about 0.5 wt % alkoxylated polyamine, from about 1 wt % to about 2 wt % chelant, from about 1 wt % to about 2 wt % organic acid, from about 0.5 wt % to about 1.5 wt % boron compound, from about 0.0025 wt % to about 0.015 wt % amylase, from about 0.0005 wt % to about 0.01 wt % mannanase, from about 0.0005 wt % to about 0.01 wt % pectinase, and mixtures thereof.

Optionally, at least one of or both of the first laundry treatment composition 13 and the second laundry treatment composition 23 can further comprise at least one of from about 1 wt % to about 3 wt % chelant, from about 1 wt % to about 3 wt % organic acid, from about 1 to about 2 wt % boron compound, from about 0.0025 wt % to about 0.0075 wt % amylase, from about 0.02 wt % to about 0.05 wt % protease, from about 0.2 wt % to about 0.3 wt % brightener, and mixtures thereof. Chelant can help reduce the adverse impact of metal ions. Organic acid can reduce the negative impact of water hardness. A boron compound can improve enzyme stability. A brightener can boost whiteness.

Optionally, one or both of the first laundry treatment composition 13 and the second laundry treatment composition 23 can further comprise from about 1 wt % to about 3 wt % chelant, from about 1 wt % to about 3 wt % organic acid, from about 1.5 wt % to about 3 wt % boron compound, from about 0.1 wt % to about 0.5 wt % alkoxylated polyamine, from about 0.2 wt % to about 0.3 wt % brightener, hueing dye, and combinations thereof. Alkoxylated polyamine can improve greasy soil removal. Hueing dye can boost whiteness.

Optionally, enzyme partially constituting the second laundry treatment composition 23 can further comprise from about 0.01 wt % to about 0.025 wt % amylase, from about 0.1 wt % to about 0.3 wt % protease, from about 0.0005 wt % to about 0.01 wt % mannanase, from about 0.0005 to about 0.01 pectinase, and combinations thereof. Amylase can be used to treat stains containing starch. Protease can be used to treat stains containing protein. Mannanase can treat stains containing galactomannan. Pectinase can be used to treat stains containing pectin. Optionally the first laundry treatment composition 13 can have a lower weight fraction of enzyme than the second laundry treatment composition 23. This approach can provide for a flexible formulation approach in which the amount of enzyme that is delivered to the wash is not necessarily tied to the amount of surfactant delivered to the wash.

Optionally, the second laundry treatment composition can further comprise from about 20 wt % to about 30 wt % a second anionic surfactant system, from about 13 wt % to about 23 wt % a second nonionic surfactant system, and from about 1 wt % to about 3 wt % a second amine oxide system. Such a relationship is practical in that even if the first laundry treatment composition 13 is depleted, the second laundry treatment composition 23 has surfactant that can assist with cleaning.

The first sub-container 10 can contain a first volume of the first laundry treatment composition 13, the second sub-container 20 can contain a second volume of the second laundry treatment composition 23, and the optional third sub-container 30 can contain a third volume of the third laundry treatment composition. The third volume can be less than the first volume and the second volume. Optionally, the third volume can be less than about 60% of the first volume and the second volume. The first volume can optionally be from about 300 to about 900 mL. The second volume can optionally be from about 300 to about 900 mL. The third volume can optionally be from about 100 ml to about 400 mL. In general, it is thought that the third laundry treatment composition 33 might be used less frequently than the first laundry treatment composition 13 and second laundry treatment composition 23. Moreover, the aforesaid range in volume of the third treatment composition 33 may be sufficient to provide the user with a one month supply of the third laundry treatment composition 33. In operation, the laundry treatment apparatus can selectively dispense from the laundry treatment cartridge 1 the first laundry treatment composition 13, the second laundry treatment composition 23, the third laundry treatment composition 33, and combinations thereof, to treat a single load of laundry. Such an approach can allow the laundry treatment apparatus to employ only one of the laundry treatment compositions to treat a load of laundry. Moreover, combinations of two or more of the laundry treatment composition at a potentially infinite number of levels relative to one another can be delivered into the laundry treatment apparatus to treat a load of laundry for which the combination and relative levels thereof is specially chosen for the load of laundry being treated and operating parameters of the laundry treatment apparatus.

Anionic Surfactant System

The first laundry treatment composition can comprise a first anionic surfactant system and the second laundry treatment composition can comprise a second anionic surfactant system. The first anionic surfactant system can be constituent part of the first laundry treatment composition 13 and the second anionic surfactant system can be a constituent part of the second laundry treatment composition 23. The first laundry treatment composition 13 is contained in the first sub-container 10 and the second laundry treatment composition 23 is contained in the second sub-container 20. Therefore, the first anionic surfactant system can be contained in the first sub-container 10 and the second anionic surfactant system can be contained in the second sub-container 20. With respect to the first anionic surfactant system and the second anionic surfactant system, the terms first and second refer to whether the anionic surfactant system is a constituent part of the first laundry treatment composition 13, which is contained in first sub-container 10 or a constituent part of the second laundry treatment composition 23, which is contained in the second sub-container 20. The first anionic surfactant system and the second anionic surfactant system can be chemically the same as one another or chemically differ from one another in some manner. The first anionic surfactant system can consist of a single anionic surfactant or a mixture of a plurality of anionic surfactants. The second anionic surfactant system can consist of a single anionic surfactant or a mixture of a plurality of anionic surfactants.

Anionic surfactants include, but are not limited to, those surface-active compounds that contain an organic hydrophobic group containing generally 8 to 22 carbon atoms or generally 8 to 18 carbon atoms in their molecular structure and at least one water-solubilizing group optionally selected from sulfonate, sulfate, and carboxylate so as to form a water-soluble compound. Usually, the hydrophobic group will comprise a C8-C22 alkyl, or acyl group. Such anionic surfactants can be employed in the form of water-soluble salts and the salt-forming cation usually can be selected from sodium, potassium, ammonium, magnesium and mono-, with the sodium cation being the usual one chosen.

Anionic surfactants and adjunct anionic cosurfactants, may exist in an acid form, and the acid form may be neutralized to form a surfactant salt which is desirable for use in the present detergent compositions. Typical agents for neutralization include the metal counterion base such as hydroxides, e.g., NaOH or KOH. Further agents for neutralizing anionic surfactants of the present invention and adjunct anionic surfactants or cosurfactants in their acid forms include ammonia, amines, oligoamines, or alkanolamines. Suitable non-limiting examples including monoethanolamine, diethanol amine, triethanol amine, and other linear or branched alkanolamines; for example, 2-amino-1-propanol, 1-aminopropanol, monoisopropanol amine, or 1-amino-3-propanol. Amine neutralization may be done to a full or partial extent, e.g. part of the anionic surfactant mix may be neutralized with sodium or potassium and part of the anionic surfactant mix may be neutralized with amines or alkanolamines.

Suitable anionic sulfonate surfactants include methyl ester sulfonates, alpha olefin sulfonates, alkyl benzene sulfonates, for example alkyl benzene sulfonates, for example $C_{10-13}$ alkyl benzene sulfonate, for example C12 alkyl benzene sulfonate. Suitable alkyl benzene sulfonate (LAS) is obtainable by sulfonating commercially available linear alkyl benzene (LAB). Suitable LAB includes low 2-phenyl LAB, such as those supplied by Sasol under the tradename ISOCHEM or those supplied by Petresa under the tradename PETRELAB. Other suitable LAB include high 2-phenyl LAB, such as that supplied by Sasol under the tradename HYBLENE. A suitable anionic surfactant is alkyl benzene sulfonate that is obtained by DETAL catalyzed process, DETAL-PLUS catalyzed process, although other synthesis routes, such as HF, and other alkylation catalysts such as zeolites ZSM-4, ZSM-12, ZSM-20, ZSM-35, ZSM- 48, ZSM-50, MCM-22, TMA OFFRETITE, TEA mordenite, mordenite, REY and zeolite beta may also be suitable. In one aspect a magnesium salt of LAS is used. Optionally, the laundry treatment composition may contain from about 0.5% to about 30%, by weight of the laundry treatment composition, of an HLAS surfactant selected from alkyl benzene sulfonic acids, alkali metal or amine salts of C10-16 alkyl benzene sulfonic acids, wherein the HLAS surfactant comprises greater than 50% by weigh, optionally greater than 60% by weight, optionally greater than 70% by weight, optionally greater than 75% by weight C12.

Suitable sulfate surfactants include alkyl sulfate, optionally C8-18 alkyl sulfate, or optionally C12/14 alkyl sulfate.

The alkyl sulfate and alkyl benzene sulfonates may be linear or branched, including 2-alkyl substituted or mid chain branched type, substituted or un-substituted, and may be derived from petrochemical material or biomaterial. Optionally, the branching group is an alkyl. The alkyl can be selected from methyl, ethyl, propyl, butyl, pentyl, cyclic alkyl groups and mixtures thereof. Single or multiple alkyl branches could be present on the main hydrocarbyl chain of the starting alcohol(s) used to produce the sulfated anionic surfactant used in the laundry treatment compositions of the invention. Optionally the branched sulfated anionic surfactant is selected from alkyl sulfates, and mixtures thereof.

Other suitable anionic surfactants include the class of glycolipids, such as sophorolipids and rhamnolipids and amino acid-based surfactants, e.g., acyl glycinates, acyl sarcosinates, acyl glutamates, and acyl taurates. The rhamnolipids may have a single rhamnose sugar ring or two rhamnose sugar rings.

The laundry treatment compositions may comprise one or more additional anionic surfactants. The laundry treatment compositions may contain 2-alkyl primary alkyl alcohol sulfates, 2-alkyl branched alcohols (and the 2-alkyl branched alkyl sulfates are positional isomers, where the location of the hydroxymethyl group) consisting of a methylene bridge (—$CH_2$-unit) connected to a hydroxy (—OH) group) on the carbon chain varies. Thus, a 2-alkyl branched alkyl alcohol is generally composed of a mixture of positional isomers. Furthermore, it is well known that fatty alcohols, such as 2-alkyl branched alcohols, and surfactants are characterized by chain length distributions. In other words, fatty alcohols and surfactants are generally made up of a blend of molecules having different alkyl chain lengths (though it is possible to obtain single chain-length cuts). Notably, the 2-alkyl primary alcohols described herein, which may have specific alkyl chain length distributions and/or specific fractions of certain positional isomers, cannot be obtained by simply blending commercially available materials. Specifically, the distribution of from about 50% to about 100% by weight surfactants having m+n=11 is not achievable by blending commercially available materials.

The laundry treatment compositions can comprise an anionic surfactant that comprises a mixture of Formula I and Formula II.

(I)

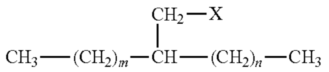

(II)

$CH_3—(CH_2)_{m+n+3}—X$

6 ≤ m ≤ 11;
0 ≤ n ≤ 5;

wherein from about 50% to about 100% by weight of the anionic surfactant comprises isomers having m+n=11; wherein from about 25% to about 50% of the mixture of surfactant isomers of Formula I have n=0; wherein from about 0.001% to about 25% by weight of the anionic surfactant comprises surfactants of Formula II; and wherein X is a hydrophilic moiety.

X may be selected from sulfates, alkoxylated alkyl sulfates, sulfonates, amine oxides, polyalkoxylates, polyhydroxy moieties, phosphate esters, glycerol sulfonates, polygluconates, polyphosphate esters, phosphonates, sulfosuccinates, sulfosuccaminates, polyalkoxylated carboxylates, glucamides, taurinates, sarcosinates, glycinates, isethionates, dialkanolamides, monoalkanolamides, monoalkanolamide sulfates, diglycolamides, diglycolamide sulfates, glycerol esters, glycerol ester sulfates, glycerol ethers, glycerol ether sulfates, polyglycerol ethers, polyglycerol ether sulfates, sorbitan esters, polyalkoxylated sorbitan esters, ammonio-alkanesulfonates, amidopropyl betaines, alkylated quats, alkylated/polyhydroxyl alkylated quats, alkylated/polyhydroxylated oxypropyl quats, imidazolines, 2-yl-succinates, sulfonated alkyl esters, sulfonated fatty acids, and mixtures thereof.

The anionic surfactant system may have between about 15% to about 40% of the mixture of surfactant isomers of Formula I having n=1, such as, for example between about 20% to about 40%, between about 25% to about 35%, or between about 30% to about 40%. The anionic surfactant system may have between about 60% to about 90% of the mixture of surfactant isomers of Formula I having n<3, such as, for example between about 65% and 85%, between about 70% and 90%, or between about 80% and 90%. The laundry treatment compositions may have between about 90% to about 100% of the anionic surfactant system wherein the isomers have m+n=11, such as, for example between about 95% and 100%.

The anionic surfactant system may have from about 15% to about 40% by weight of the anionic surfactant mixture of isomers of Formula I with n=1 and from about 5% to about 20% by weight of the anionic surfactant system are isomers of Formula I with n=2. The anionic surfactant system may have no isomers of Formula I with n equal to or greater than 6. The anionic surfactant system may have up to about 40% of the mixture of anionic surfactant isomers of Formula I with n>2. The anionic surfactant system may have up to about 25% of the mixture of anionic surfactant isomers of Formula I have n>2. The anionic surfactant system may have up to about 20% by weight of the Formula II isomer.

The anionic surfactant system may further comprise an anionic surfactant, wherein the anionic surfactant consists essentially of or comprises a mixture of anionic surfactant isomers of Formula III and Formula IV:

(III)

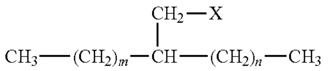

(IV)

$CH_3—(CH_2)_{m+n+3}—X$

6 ≤ m ≤ 9;
0 ≤ n ≤ 5;

wherein from about 50% to about 100% by weight of the anionic surfactant system are isomers having m+n=9; wherein from about 0.001% to about 25% by weight of the anionic surfactant system are anionic surfactants of Formula IV; and wherein X is a hydrophilic moiety. X may be selected from alkyl sulfates, alkoxylated alkyl sulfates, sulfonates, amine oxides, polyalkoxylates, polyhydroxy moieties, phosphate esters, glycerol sulfonates, polygluconates, polyphosphate esters, phosphonates, sulfosuccinates, sulfosuccaminates, polyalkoxylated carboxylates, glucamides, taurinates, sarcosinates, glycinates, isethionates, dialkanolamides, monoalkanolamides, monoalkanolamide sulfates, diglycolamides, diglycolamide sulfates, glycerol esters, glycerol ester sulfates, glycerol ethers, glycerol ether sulfates, polyglycerol ethers, polyglycerol ether sulfates, sorbitan esters, polyalkoxylated sorbitan esters, ammonio-alkanesulfonates, amidopropyl betaines, alkylated quats, alkylated/polyhydroxyl alkylated quats, alkylated/polyhydroxylated oxypropyl quats, imidazolines, 2-yl-succinates, sulfonated alkyl esters, sulfonated fatty acids, and mixtures thereof.

Between about 25% to about 50% of the anionic surfactant isomers of Formula III may have n=0, such as, for example between 30% and 45%, between 35% and 45%, or between 40% and 50%. Between about 15% to about 40% of the mixture of anionic surfactant isomers of Formula III may have n=1, such as, for example, between 20% and 40%, between 25% and 35%, or between 30% and 40%. Between about 50% to about 90% of the mixture of anionic surfactant isomers of Formula III may have n<3, such as, for example between 55% and 90%, between 60% and 80%, or between 70% and 90%. Between about 90% to about 100% of the anionic surfactant may comprise isomers having m+n=9, such as, for example between 95% and 100%.

The anionic surfactant system may have from about 25% to about 50% by weight of the anionic surfactant system isomers of Formula III with n=0, from about 15% to about 40% by weight of the second anionic surfactant system isomers of Formula III with n=1, and from about 5% to about 20% by weight of the anionic surfactant system isomers of Formula III with n=2. Up to about 40% of the anionic surfactant isomers of Formula III may have n>2. Up to about 35% of the anionic surfactant of Formula III may have n>2. The anionic surfactant system may comprise up to about 20% by weight of the Formula IV isomer.

The anionic surfactant can be alkyl alkoxylated sulphate, optionally a $C_{8-18}$ alkyl alkoxylated sulphate, optionally a $C_{8-18}$ alkyl ethoxylated sulphate, optionally the alkyl alkoxylated sulphate has an average degree of alkoxylation of from 0.5 to 20, optionally from 0.5 to 10, optionally the alkyl alkoxylated sulphate is a $C_{8-18}$ alkyl ethoxylated sulphate having an average degree of ethoxylation of from 0.5 to 10, optionally from 0.5 to 5, optionally from 0.5 to 3 or from about 1.5 to 3 or from about 1.8 to 2.5. The alkyl alkoxylated sulfate may have a broad alkoxy distribution or a peaked alkoxy distribution. The alkyl portion of the AES may include, on average, from 13.7 to about 16 or from 13.9 to 14.6 carbons atoms. At least about 50% or at least about 60% of the AES molecule may include having an alkyl portion having 14 or more carbon atoms, optionally from 14 to 18, or from 14 to 17, or from 14 to 16, or from 14 to 15 carbon atoms.

The alkyl sulphate, alkyl alkoxylated sulphate and alkyl benzene sulphonates may be linear or branched, including 2-alkyl substituted or mid chain branched type, substituted or un-substituted, and may be derived from petrochemical material or biomaterial. Optionally, the branching group is an alkyl. Optionally, the alkyl is selected from methyl, ethyl, propyl, butyl, pentyl, cyclic alkyl groups and mixtures thereof. Single or multiple alkyl branches could be present on the main hydrocarbyl chain of the starting alcohol(s) used to produce the sulfated anionic surfactant used in the detergent of the invention. Optionally the branched sulfated anionic surfactant is selected from alkyl sulfates, alkyl ethoxy sulfates, and mixtures thereof.

Alkyl sulfates and alkyl alkoxy sulfates are commercially available with a variety of chain lengths, ethoxylation and branching degrees. Commercially available alkyl sulfates include those based on NEODOL alcohols ex the Shell company; LIAL, ISALCHEM, SAFOL, ALFOL, NACOL, NAFOL, ISOFOL, and MARLIPAL ex the Sasol company; and natural alcohols ex The Procter & Gamble Chemicals Company.

Non-Ionic Surfactant System

The first laundry treatment composition 13 can comprise a first nonionic surfactant system and the second laundry treatment composition 23 can comprise a second nonionic surfactant system. The first nonionic surfactant system is a constituent part of the first laundry treatment composition 13 and the second nonionic surfactant system is a constituent part of the second laundry treatment composition 23. The first laundry treatment composition 13 is contained in the first sub-container 10 and the second laundry treatment composition 23 is contained in the second sub-container 20. Therefore, the first nonionic surfactant system is contained in the first sub-container 10 and the second nonionic surfactant system is contained in the second sub-container 20. With respect to the first nonionic surfactant system and the second nonionic surfactant system, the terms first and second refer to whether the nonionic surfactant system is a constituent part of the first laundry treatment composition 13, which is contained in first sub-container 10 or a constituent part of the second laundry treatment composition 23, which is contained in the second sub-container 20. The first nonionic surfactant system and the second nonionic surfactant system can be chemically the same as one another or chemically differ from one another in some manner. The first nonionic surfactant system can consist of a single nonionic surfactant or a mixture of a of nonionic surfactants. The second nonionic surfactant system can consist of a single nonionic surfactant or a mixture of a nonionic surfactants.

Suitable nonionic surfactants can be selected from: $C_8$-$C_{18}$ alkyl ethoxylates, such as, NEODOL nonionic surfactants from Shell; alkyl polysaccharides, optionally alkylpolyglycosides and alkyl polypentosides; fatty acid methyl ester ethoxylates; polyhydroxy fatty acid amides; ether capped poly(oxyalkylated) alcohol surfactants; alkyl and alkenyl furan sulfonates and alkyl and alkenyl furan sulfates, and mixtures thereof.

Suitable nonionic surfactants can include alkyl polyglucosides and/or an alkyl alkoxylated alcohol.

Suitable nonionic surfactants can include alkyl alkoxylated alcohols, optionally $C_{8-18}$ alkyl alkoxylated alcohol, optionally a $C_{8-18}$ alkyl ethoxylated alcohol, optionally the alkyl alkoxylated alcohol has an average degree of alkoxylation of from 1 to 50, optionally from 1 to 30, or from 1 to 20, or from 1 to 10, optionally the alkyl alkoxylated alcohol is a $C_{8-18}$ alkyl ethoxylated alcohol having an average degree of ethoxylation of from 1 to 10, optionally from 1 to 7, optionally from 1 to 5 and optionally from 3 to 7. In one aspect, the alkyl alkoxylated alcohol is a $C_{12-15}$ alkyl ethoxylated alcohol having an average degree of ethoxylation of from 7 to 10. The alkyl alkoxylated alcohol can be linear or branched and substituted or un-substituted. Suitable nonionic surfactants can include those with the trade name LUTENSOL from BASF. The alkyl alkoxylated sulfate may have a broad alkoxy distribution for example ALFONIC 1214-9 ethoxylate or a peaked alkoxy distribution for example NOVEL 1214-9 both commercially available from Sasol.

Amine Oxide

The first laundry treatment composition 13 can comprise a first amine oxide system and the second laundry treatment composition 23 can comprise a second amine oxide system. The first amine oxide system is constituent part of the first laundry treatment composition 13 and the second amine oxide system is a constituent part of the second laundry treatment composition 23. The first laundry treatment composition 13 is contained in the first sub-container 10 and the second laundry treatment composition 23 is contained in the second sub-container 23. Therefore, the first amine oxide system is contained in the first sub-container 10 and the second amine oxide system is contained in the second sub-container 20. With respect to the first amine oxide system and the second amine oxide system, the terms first and second refer to whether the amine oxide system is a constituent part of the first laundry treatment composition 13, which is contained in first sub-container 10 or a constituent part of the second laundry treatment composition 23, which is contained in the second sub-container 20. The first amine oxide system and the second amine oxide system can be chemically the same as one another or chemically differ from one another in some manner. The first amine oxide system can consist of a single amine oxide or a mixture of amine oxides. The second amine oxide system can consist of a single amine oxide or a mixture of amine oxides.

The amine oxide system can include alkyl dimethyl amine oxide or alkyl amidopropyl dimethyl amine oxide, optionally alkyl dimethyl amine oxide and optionally coco dimethyl amino oxide. Amine oxide may have a linear or mid-branched alkyl moiety. Typical linear amine oxides include water-soluble amine oxides containing one R1 C8-18 alkyl moiety and 2 R2 and R3 moieties selected from the group consisting of C1-3 alkyl groups and C1-3 hydroxyalkyl groups. Optionally the amine oxide can be characterized by the formula R1-N(R2)(R3) O wherein R1 is a C8-18 alkyl and R2 and R3 are selected from the group consisting of methyl, ethyl, propyl, isopropyl, 2-hydroxyethyl, 2-hydroxypropyl and 3-hydroxypropyl. The linear amine oxide surfactants in particular may include linear C10-C18 alkyl dimethyl amine oxides and linear C8-C12 alkoxy ethyl dihydroxy ethyl amine oxides.

Soil Release Polymer

At least one of the first laundry treatment composition 13 and the second laundry treatment composition 23 can further comprise from about 0.5 wt % to about 1.5 wt % soil release polymer, The soil release polymer can have a structure as defined by one of the following Formula (VI), (VII) or (VIII):

$$-[(OCHR^1-CHR^2)_a-O-OC-Ar-CO-]_d \quad (VI)$$

$$-[(OCHR^3-CHR^4)_b-O-OC\text{-}sAr-CO-]_e \quad (VII)$$

$$-[(OCHR^5-CHR^6)_c-OR^7]_f \quad (VIII)$$

wherein:

a, b and c are from 1 to 200;

d, e and f are from 1 to 50;

Ar is a 1,4-substituted phenylene;

sAr is 1,3-substituted phenylene substituted in position 5 with $SO_3Me$;

Me is Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable soil release polymers are polyester soil release polymers such as REPEL-O-TEX polymers, including REPEL-O-TEX SF, SF-2 and SRP6 supplied by Rhodia. Other suitable soil release polymers include TEXCARE polymers, including TEXCARE SRA100, SRA300, SRN100, SRN170, SRN240, SRN260, SRN300 and SRN325 supplied by Clariant. Other suitable soil release polymers include MARLOQUEST polymers, such as MARLOQUEST SL supplied by Sasol.

Bleaching Agent

The third laundry treatment composition 33 can comprise one or more bleaching agents. Suitable bleaching agents other than bleaching catalysts include photobleaches, bleach activators, hydrogen peroxide, sources of hydrogen peroxide, pre-formed peracids and mixtures thereof. The third laundry treatment composition 33 may comprise from about 0.1% to about 50% or even from about 0.1% to about 25% or even about 8% to about 20% bleaching agent or mixtures of bleaching agents by weight of the third laundry treatment composition. Examples of suitable bleaching agents include:

(1) photobleaches for example sulfonated zinc phthalocyanine sulfonated aluminium phthalocyanines, xanthene dyes, thioxanthones, and mixtures thereof;

(2) pre-formed peracids: Suitable preformed peracids include, but are not limited to compounds selected from the group consisting of pre-formed peroxyacids or salts thereof typically a percarboxylic acids and salts, percarbonic acids and salts, perimidic acids and salts, peroxymonosulfuric acids and salts, for example, OXONE, and mixtures thereof. The peroxyacids can be phthalimido-peroxy-alkanoic acids, in particular ε-phthalimido peroxy hexanoic acid (PAP). The peroxyacid or salt thereof can have a melting point in the range of from 30° C. to 60° C.

(3) sources of hydrogen peroxide, for example, inorganic perhydrate salts, including alkali metal salts such as sodium salts of perborate (usually mono- or tetrahydrate), percarbonate, persulphate, perphosphate, persilicate salts and mixtures thereof. When employed, inorganic perhydrate salts can be present in amounts of from 0.05 to 40 wt %, or 1 to 30 wt % of the overall fabric and home care product and are typically incorporated into such fabric and home care products as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators having R—(C═O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS).

(5) Bleach Catalysts. The third laundry treatment composition 33 of the present invention may also include one or more bleach catalysts capable of accepting an oxygen atom from a peroxyacid and/or salt thereof, and transferring the oxygen atom to an oxidizeable substrate. Suitable bleach catalysts include, but are not limited to iminium cations and polyions; iminium zwitterions; modified amines; modified amine oxides; N-sulphonyl imines; N-phosphonyl imines; N-acyl imines; thiadiazole dioxides; perfluoroimines; cyclic sugar ketones and alpha amino-ketones and mixtures thereof. One particularly preferred catalyst is acyl hydrazone type such as 4-(2-(2-((2-hydroxyphenylmethyl)methylene)-hydrazinyl)-2-oxoethyl)-4-methylchloride.

(6) The third laundry treatment composition 33 may optionally comprise catalytic metal complexes. One optional type of metal-containing bleach catalyst is a catalyst system comprising a transition metal cation of defined bleach catalytic activity, such as copper, iron, titanium, ruthenium, tungsten, molybdenum, or manganese cations.

If desired, the third laundry treatment composition 33 herein can be catalyzed by means of a manganese compound. Such compounds include, for example, the manganese-based catalysts disclosed in U.S. Pat. No. 5,576,282. In some embodiments, an additional source of oxidant in the composition is not present, molecular oxygen from air provides the oxidative source. Cobalt bleach catalysts useful herein are known, and are described, for example, in U.S. Pat. Nos. 5,597,936; 5,595,967.

The bleaching agent can be from about 8 wt % to about 20 wt % phthalimidoperoxycaproic acid.

Enzymes

One or both of the first laundry treatment composition 13 and the second laundry treatment composition 23 may comprise enzymes, optionally from about 0.001 wt % to about 0.3 wt % enzyme. Enzymes can provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, ß-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in the composition, the aforementioned additional enzymes may be present in one or more of the laundry treatment compositions at levels from about 0.00001% to about 2%, from about 0.0001% to about 1% or even from about 0.001% to about 0.5% enzyme protein by weight of the composition.

One or both of the first laundry treatment composition 13 and the second laundry treatment composition 23 may comprise a protease. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), especially those derived from *Bacillus*, such as *Bacillus* sp., *B. lentus, B. alkalophilus, B. subtilis, B. amyloliquefaciens, B pumilus, B. gibsonii*, and *B. akibaii* described in WO2004067737, WO2015091989, WO2015091990, WO2015024739, WO2015143360, U.S. Pat. No. 6,312,936 B1, U.S. Pat. Nos. 5,679,630, 4,760,025, DE102006022216A1, DE102006022224A1, WO2015089447, WO2015089441, WO2016066756, WO2016066757, WO2016069557, WO2016069563, WO2016069569 and WO2016174234. Specifically, mutations S9R, A15T, V66A, A188P, V199I, Q239R, N2/55D (savinase numbering system).

(b) trypsin-type or chymotrypsin-type proteases, such as trypsin (e.g., of porcine or bovine origin), including the *Fusarium* protease described in WO 89/06270 and the chymotrypsin proteases derived from Cellumonas described in WO 05/052161 and WO 05/052146.

(c) metalloproteases, especially those derived from *Bacillus amyloliquefaciens* described in WO07/044993A2; from *Bacillus, Brevibacillus, Thermoactinomyces, Geobacillus, Paenibacillus, Lysinibacillus* or *Streptomyces* spp. Described in WO2014194032, WO2014194054 and WO2014194117; from *Kribella alluminosa* described in WO2015193488; and from *Streptomyces* and *Lysobacter* described in WO2016075078.

(d) protease having at least 90% identity to the subtilase from *Bacillus* sp. TY145, NCIMB 40339, described in WO92/17577 (Novozymes A/S), including the variants of this *Bacillus* sp TY145 subtilase described in WO2015024739, and WO2016066757.

The protease can be polypeptides.

Suitable commercially available additional protease enzymes include those sold under the trade names ALCALASE, SAVINASE, PRIMASE, DURAZYM, POLARZYME, KANNASE, LIQUANASE, LIQUANASE ULTRA, SAVINASE ULTRA, OVOZYME, NEUTRASE, EVERLASE, CORONASE, BLAZE, BLAZE ULTRA AND ESPERASE BY NOVOZYMES A/S (DENMARK); those sold under the tradename MAXATASE, MAXACAL®, MAXAPEM, PROPERASE, PURAFECT, PURAFECT PRIME, PURAFECT OX, FN3, FN4, EXCELLASE, ULTIMASE AND PURAFECT OXP by Dupont; those sold under the tradename OPTICLEAN AND OPTIMASE by Solvay Enzymes; and those available from Henkel/Kemira, namely BLAP.

The protease can be selected from the group of PROPERASE, BLAZE, ULTIMASE, EVERLASE, SAVINASE, EXCELLASE, BLAZE ULTRA, BLAP and BLAP variants.

The level of protease in the laundry treatment compositions of the invention can be from about 0.05 to about 10, more preferably from about 0.5 to about 7 and especially from about 1 to about 6 mg of active protease/g of laundry treatment composition.

The enzyme can be an amylase. Suitable alpha-amylases include those of bacterial or fungal origin. Chemically or genetically modified mutants (variants) are included. The amylase can be derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCBI 12289, NCBI 12512, NCBI 12513, DSM 9375 (U.S. Pat. No. 7,153,818) DSM 12368, DSMZ no. 12649, KSM AP1378 (WO 97/00324), KSM K36 or KSM K38 (EP 1,022,334). The amylase can be:

(a) optionally variants described in U.S. Pat. No. 5,856,164 and WO99/23211, WO96/23873, WO00/60060, WO06/002643 and WO2017/192657.
(b) optionally variants and variants described in WO 00/60060, WO2011/100410 and WO2013/003659.
(c) optionally variants in U.S. Pat. No. 6,093,562.
(d) optionally variants described in WO09/149130, optionally the wild-type enzyme from *Geobacillus Stearophermophilus* or a truncated version thereof.
(e) optionally variants described in WO10/115021.
(f) optionally variants in WO2016091688.
(g) optionally variants described in WO2014099523.
(h) optionally variants described in WO2014099523, optionally those in WO20141647774.
(i) optionally variants in WO2009149271.
(j) optionally wild-type amylase.
(k) optionally variants described in WO2016180748.
(l) optionally variants described in WO2018060216.

Optionally the amylase is an engineered enzyme, wherein one or more of the amino acids prone to bleach oxidation have been substituted by an amino acid less prone to oxidation. In particular it is optional that methionine residues are substituted with any other amino acid. In particular it is optional that the methionine most prone to oxidation is substituted.

Suitable commercially available alpha-amylases include DURAMYL, LIQUEZYME, TERMAMYL, TERMAMYL ULTRA, NATALASE, SUPRAMYL, STAINZYME, STAINZYME PLUS, FUNGAMYL, ATLANTIC, ACHIEVE ALPHA, AMPLIFY PRIME, INTENSA and BAN (Novozymes A/S, Bagsvaerd, Denmark), KEMZYM AT 9000 Biozym Biotech Trading GmbH Wehlistrasse 27b A-1200 Wien Austria, RAPIDASE, PURASTAR, ENZYSIZE, OPTISIZE HT PLUS, POWERASE, PREFERENZ S series (including PREFERENZ S1000 and PREFERENZ S2000 and PURASTAR OXAM (DuPont., Palo Alto, California) and KAM (Kao, 14-10 Nihonbashi Kayabacho, 1-chome, Chuo-ku Tokyo 103-8210, Japan).

The laundry treatment compositions of the invention can comprise at least 0.01 mg, optionally from about 0.05 to about 10, optionally from about 0.1 to about 6, optionally from about 0.2 to about 5 mg of active amylase/g of composition.

Optionally, the protease and/or amylase of the composition of the invention can be in the form of granulates, the granulates can comprise more than 29% of sodium sulfate by weight of the granulate and/or the sodium sulfate and the active enzyme (protease and/or amylase) can be in a weight ratio of between 3:1 and 100:1 or optionally between 4:1 and 30:1 or optionally between 5:1 and 20:1.

The enzyme can comprise a lipase. Suitable lipases can include those of bacterial, fungal or synthetic origin, and variants thereof. Chemically modified or protein engineered mutants are also suitable. Examples of suitable lipases include lipases from *Humicola* (synonym *Thermomyces*), e.g., from *H. lanuginosa* (*T. lanuginosus*).

The lipase may be a "first cycle lipase", e.g. such as those described in WO06/090335 and WO 13/116261. In one aspect, the lipase can be a first-wash lipase, optionally a variant of the wild-type lipase from *Thermomyces lanuginosus* comprising T231R and/or N233R mutations. Optional lipases include those sold under the tradenames LIPEX, LIPOLEX and LIPOCLEAN by Novozymes, Bagsvaerd, Denmark.

Other suitable lipases include: LIPRL 139, e.g. as described in WO2013/171241; TfuLip2, e.g. as described in WO2011/084412 and WO2013/033318; *Pseudomonas stutzeri* lipase, e.g. as described in WO2018228880; *Microbulbifer thermotolerans* lipase, e.g. as described in WO2018228881; *Sulfobacillus acidocaldarius* lipase, e.g. as described in EP3299457; LIP062 lipase e.g. as described in WO2018209026; PinLip lipase e.g. as described in WO2017036901 and *Absidia* sp. *lipase* e.g. as described in WO2017005798.

Suitable lipases are commercially available from Novozymes, for example as LIPEX EVITY 100L, LIPEX EVITY 200L (both liquid raw materials) and LIPEX EVITY 105T (a granulate). These lipases have different structures to the products LIPEX 100L, LIPEX 100T and LIPEX EVITY 100T.

The enzyme can be a cellulase. The cellulase can be cellulases of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and 5,691,178. Suitable cellulases include the alkaline or neutral cellulases having color care benefits. Commercially available cellulases include CELLUZYME, CAREZYME and CAREZYME PREMIUM (Novozymes A/S), CLAZINASE, and PURADAX HA (Genencor International Inc.), and KAC-500(B) (Kao Corporation).

Preferred cellulases include:
a) Variants in WO2017084560.
b) Variants in WO2017106676.

The bacterial cleaning cellulase may be a glycosyl hydrolase having enzymatic activity towards amorphous cellulose substrates, wherein the glycosyl hydrolase is selected from GH families 5, 7, 12, 16, 44 or 74. Suitable glycosyl hydrolases may also be selected from the group consisting of: GH family 44 glycosyl hydrolases from *Paenibacillus polyxyma* (wild-type) such as XYG1006 described in U.S. Pat. No. 7,361,736 or are variants thereof. GH family 12 glycosyl hydrolases from *Bacillus licheniformis* (wild-type) such as described in U.S. Pat. No. 6,268,197 or are variants thereof; GH family 5 glycosyl hydrolases from *Bacillus agaradhaerens* (wild type) or variants thereof; GH family 5 glycosyl hydrolases from *Paenibacillus* (wild type) such as XYG1034 and XYG 1022 described in U.S. Pat. No. 6,630,340 or variants thereof; GH family 74 glycosyl hydrolases from *Jonesia* sp. (wild type) such as XYG1020 described in WO 2002/077242 or variants thereof; and GH family 74 glycosyl hydrolases from *Trichoderma Reesei* (wild type), such as the enzyme described in more detail in U.S. Pat. No. 7,172,891, or variants thereof. Suitable bacterial cleaning cellulases are sold under the tradenames CELLUCLEAN and WHITEZYME (Novozymes A/S, Bagsvaerd, Denmark).

In one aspect, the laundry treatment compositions may comprise a fungal cleaning cellulase belonging to glycosyl hydrolase family 45 having a molecular weight of from 17 kDa to 30 kDa, for example the endoglucanases sold under the tradename BIOTOUCH NCD, DCC, DCL and FLX1 (AB Enzymes, Darmstadt, Germany). Additionally, optional cellulases include the ones covered in WO2016066896.

The laundry treatment compositions may comprise mannanase. As used herein, the term "mannanase" or "galactomannanase" denotes a mannanase enzyme defined according to that known in the art as mannan endo-1,4-beta-mannosidase and having the alternative names beta-mannanase and endo-1,4-mannanase and catalyzing hydrolysis of 1,4-beta-D-mannosidic linkages in mannans, galactomannans, glucomannans, and galactoglucomannans Mannanases are classified according to the Enzyme Nomenclature as EC 3.2.1.78.

Suitable mannanase can be selected from mannanase from the glycoside hydrolase family 26 that catalyze the hydrolysis of 1,4-3-D-mannosidic linkages in mannans, galactomannans and glucomannans. Suitable examples are described in WO2015040159.

Additional optional mannanases include those sold under the tradenames MANNAWAY (all from Novozymes A/S, Bagsvaerd, Denmark), and PURABRITE, EFFECTENZ, PREFERENZ (Genencor International Inc., Palo Alto, California) and BIOTOUCH (AB Enzymes, Darmstadt, Germany).

The laundry treatment compositions can comprise pectate lyase. Optionally pectate lyases include those sold under the tradenames PECTAWASH, PECTAWAY, XPECT.

The laundry treatment compositions may comprise a nuclease enzyme. The nuclease enzyme is an enzyme capable of cleaving the phosphodiester bonds between the nucleotide sub-units of nucleic acids. The nuclease enzyme herein can be a deoxyribonuclease or ribonuclease enzyme or a functional fragment thereof. By functional fragment or part is meant the portion of the nuclease enzyme that catalyzes the cleavage of phosphodiester linkages in the DNA backbone and so is a region of said nuclease protein that retains catalytic activity. Thus it includes truncated, but functional versions, of the enzyme and/or variants and/or derivatives and/or homologues whose functionality is maintained. The nuclease enzyme can be a deoxyribonuclease, preferably selected from any of the classes E.C. 3.1.21.x, where x=1, 2, 3, 4, 5, 6, 7, 8 or 9, E.C. 3.1.22.y where y=1, 2, 4 or 5, E.C. 3.1.30.z where z=1 or 2, E.C. 3.1.31.1 and mixtures thereof. Nuclease enzymes may include superoxide dismutase in minor amounts.

The laundry treatment compositions may comprise an extracellular polymer-degrading enzyme that includes an endo-beta-1,6-galactanase enzyme. The term "endo-beta-1, 6-galactanase" or "a polypeptide having endo-beta-1,6-galactanase activity" means an endo-beta-1,6-galactanase activity (EC 3.2.1.164) from the glycoside hydrolase family 30 that catalyzes the hydrolytic cleavage of 1,6-3-D-galactooligosaccharides with a degree of polymerization (DP) higher than 3, and their acidic derivatives with 4-O-methylglucosyluronate or glucosyluronate groups at the non-reducing terminals. For purposes of the present disclosure, endo-beta-1,6-galactanase activity is determined according to the procedure described in WO 2015185689 in Assay I. Suitable examples from class EC 3.2.1.164 are described in WO 2015185689.

The laundry treatment compositions may comprise other enzymes. Suitable enzymes provide cleaning performance and/or fabric care benefits. Examples of other suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, ß-glucanases, arabinosidases, hyaluronidase, chondroitinase, laccase, and known amylases, or combinations thereof. An optional enzyme system further comprises a cocktail of conventional detersive enzymes such as protease, lipase, cutinase and/or cellulase in conjunction with amylase. Detersive enzymes is described in greater detail in U.S. Pat. No. 6,579,839.

The laundry treatment compositions can comprise xanthan endoglucanase and or xanthan lyase. The term xanthan endoglucanase denotes an enzyme exhibiting endo-beta-1, 4-glucanase activity that is capable of catalyzing hydrolysis of the 1,4-linked β-D-glucose polymeric backbone of xanthan gum in conjunction with a suitable xanthan lyase enzyme. The xanthan endoglucanase in accordance with the invention has endo-beta-1,4-glucanase activity. The term "xanthan lyase" denotes an enzyme that cleaves the β-D-mannosyl-β-D-1,4-glucuronosyl bond of xanthan and have been described in the literature. Xanthan lyases are classified according to the Enzyme Nomenclature as EC 4.2.2.12, and are known to be produced by many xanthan-degrading bacteria including *Bacillus, Corynebacterium* and *Paenibacillus* species. The xanthan lyase in accordance with the invention has xanthan lyase activity.

The laundry treatment compositions can comprise an enzyme stabilizer. The composition may preferably comprise enzyme stabilizers. Any conventional enzyme stabilizer may be used, for example by the presence of water-soluble sources of calcium and/or magnesium ions in the finished fabric and home care products that provide such ions to the enzymes. In case of aqueous compositions comprising protease, a reversible protease inhibitor, such as a boron compound including borate, or preferably 4-formyl phenylboronic acid, phenylboronic acid and derivatives thereof, or compounds such as calcium formate, sodium formate and 1,2-propane diol can be added to further improve stability.

Organic Acid

The laundry treatment compositions can comprise organic acid selected from acetic acid, lactic acid, adipic acid, aspartic acid, carboxymethyloxymalonic acid, carboxymethyloxysuccinic acid, citric acid, formic acid, glutaric acid, hydroxyethyliminodiacetic acid, iminodiacetic acid, lactic acid, maleic acid, malic acid, malonic acid, oxydiacetic acid, oxydisuccinic acid, succinic acid, sulfamic acid, tartaric acid, tartaric-disuccinic acid, tartaric-monosuccinic acid, or mixtures thereof.

Polymers

The laundry treatment compositions may comprise one or more polymers. Examples are optionally modified carboxymethylcellulose, modified polyglucans, poly(vinyl-pyrrolidone), poly (ethylene glycol), poly(vinyl alcohol), poly (vinylpyridine-N-oxide), poly(vinylimidazole), polycarboxylates such as polyacrylates, maleic/acrylic acid copolymers and lauryl methacrylate/acrylic acid co-polymers.

The laundry treatment compositions may comprise one or more amphiphilic cleaning polymers. Such polymers have balanced hydrophilic and hydrophobic properties such that they remove grease particles from fabrics and surfaces. Suitable amphiphilic alkoxylated grease cleaning polymers comprise a core structure and a plurality of alkoxylate groups attached to that core structure. These may comprise alkoxylated polyalkylenimines, especially ethoxylated polyethylene imines or polyethyleneimines having an inner polyethylene oxide block and an outer polypropylene oxide block. Typically, these may be incorporated into the compositions of the invention in amounts of from about 0.005 to about 10 wt %, generally from about 0.5 to about 8 wt %, optionally from about 0.5 to about 1.5 wt %, optionally from about 1 to about 3 wt %.

Zwitterionic Polyamine

The laundry treatment compositions may comprise a zwitterionic polyamine that is a modified hexamethylenediamine. The modification of the hexamethylenediamine includes: (1) one or two alkoxylation modifications per nitrogen atom of the hexamethylenediamine. The alkoxylation modification consisting of the replacement of a hydrogen atom on the nitrogen of the hexamethylenediamine by a (poly)alkoxylene chain having an average of about 1 to about 40 alkoxy moieties per modification, wherein the terminal alkoxy moiety of the alkoxylene chain is capped with hydrogen, a C1-C4 alkyl, sulfates, carbonates, or mixtures thereof; (2) a substitution of one C1-C4 alkyl moiety and one or two alkoxylation modifications per nitrogen atom of the hexamethylenediamine. The alkoxylation modification consisting of the replacement of a hydrogen atom by a (poly)alkoxylene chain having an average of about 1 to about 40 alkoxy moieties per modification wherein the terminal alkoxy moiety of the alkoxylene chain is capped with hydrogen, a C1-C4 alkyl or mixtures thereof; or (3) a combination thereof.

Amphiphilic Graft Copolymer

The laundry treatment compositions can comprise amphiphilic graft copolymer. Amphiphilic graft co-polymer(s) can comprise (i) polyethylene glycol backbone; and (ii) and at least one pendant moiety selected from polyvinyl acetate, polyvinyl alcohol and mixtures thereof. An example of amphiphilic graft co-polymer is SOKALAN HP22, supplied from BASF. Other suitable polymers include random graft copolymers, preferably a polyvinyl acetate grafted polyethylene oxide copolymer having a polyethylene oxide backbone and multiple polyvinyl acetate side chains. The molecular weight of the polyethylene oxide backbone can be about 6000 and the weight ratio of the polyethylene oxide to polyvinyl acetate is about 40 to about 60 and less than or equal to 1 grafting point per 50 ethylene oxide units. Typically, these are incorporated into the compositions of the invention in amounts from about 0.005 to about 10 wt %, more usually from about 0.05 to about 8 wt %.

Alkoxylated Polyamine-Based Polymers

The laundry treatment compositions may comprise alkoxylated polyamines. Such materials include but are not limited to ethoxylated polyethyleneimine, ethoxylated hexamethylene diamine, and sulfated versions thereof. Polypropoxylated derivatives are also included. A wide variety of amines and polyalkyleneimines can be alkoxylated to various degrees, and optionally further modified to provide the abovementioned benefits. A useful example is 600 g/mol polyethyleneimine core ethoxylated to 20 EO groups per NH. A preferred ethoxylated polyethyleneimine is PE-20 available from BASF.

Useful alkoxylated polyamine based polymers include the alkoxylated polyethylene imine type where said alkoxylated polyalkyleneimine has a polyalkyleneimine core with one or more side chains bonded to at least one nitrogen atom in the polyalkyleneimine core, wherein said alkoxylated polyalkyleneimine has an empirical formula (I) of $(PEI)_a$-$(EO)_b$—$R_1$, wherein a is the average number-average molecular weight ($MW_{PEI}$) of the polyalkyleneimine core of the alkoxylated polyalkyleneimine and is in the range of from 100 to 100,000 Daltons, wherein b is the average degree of ethoxylation in said one or more side chains of the alkoxylated polyalkyleneimine and is in the range of from 5 to 40, and wherein $R_1$ is independently selected from the group consisting of hydrogen, $C_1$-$C_4$ alkyls, and combinations thereof.

Other suitable alkoxylated polyalkyleneimine include those wherein said alkoxylated polyalkyleneimine has a polyalkyleneimine core with one or more side chains bonded to at least one nitrogen atom in the polyalkyleneimine core, wherein the alkoxylated polyalkyleneimine has an empirical formula (II) of $(PEI)_o$-$(EO)_m(PO)_n$—$R_2$ or $(PEI)_o$—$(PO)_n(EO)_m$—$R_2$, wherein o is the average number-average molecular weight ($MW_{PEI}$) of the polyalkyleneimine core of the alkoxylated polyalkyleneimine and is in the range of from 100 to 100,000 Daltons, wherein m is the average degree of ethoxylation in said one or more side chains of the alkoxylated polyalkyleneimine which ranges from 10 to 50, wherein n is the average degree of propoxylation in said one or more side chains of the alkoxylated polyalkyleneimine which ranges from 1 to 50, and wherein $R_2$ is independently selected from the group consisting of hydrogen, $C_1$-$C_4$ alkyls, and combinations thereof.

Cellulosic Polymer

The laundry treatment compositions can comprise cellulosic polymer. Suitable cellulosic polymers can be selected from alkyl cellulose, alkyl alkoxyalkyl cellulose, carboxyalkyl cellulose, alkyl carboxyalkyl cellulose, sulphoalkyl cellulose, more preferably selected from carboxymethyl cellulose, methyl cellulose, methyl hydroxyethyl cellulose, methyl carboxymethyl cellulose, and mixtures thereof. Suitable carboxymethyl celluloses can have a degree of carboxymethyl substitution from about 0.5 to about 0.9 and a molecular weight from about 100,000 Da to about 300,000 Da. Suitable carboxymethyl celluloses have a degree of substitution greater than about 0.65 and a degree of blockiness greater than about 0.45, e.g. as described in WO09/154933.

The laundry treatment compositions of the present invention may also include one or more cellulosic polymers including those selected from alkyl cellulose, alkylalkoxyalkyl cellulose, carboxyalkyl cellulose, alkyl carboxyalkyl cellulose. In one aspect, the cellulosic polymers are selected from the group comprising carboxymethyl cellulose, methyl cellulose, methyl hydroxyethyl cellulose, methyl carboxymethyl cellulose, and mixtures thereof. In one aspect, the carboxymethyl cellulose has a degree of carboxymethyl substitution from 0.5 to 0.9 and a molecular weight from 100,000 Da to 300,000 Da. Examples of carboxymethylcellulose polymers are Carboxymethyl cellulose commercially sold by CPKelko as FINNFIX GDA, hydrophobically modified carboxymethyl cellulose, for example the alkyl ketene dimer derivative of carboxymethylcellulose sold commercially by CPKelco as FINNFIX SH1, or the blocky carboxymethylcellulose sold commercially by CPKelco as FINNFIX V.

Other Water-Soluble Polymers

The laundry treatment compositions of the present invention may also include other water-soluble polymers. Examples of water soluble polymers include but are not limited to polyvinyl alcohols (PVA), modified PVAs; polyvinyl pyrrolidone; PVA copolymers such as PVA/polyvinyl pyrrolidone and PVA/polyvinyl amine; partially hydrolyzed polyvinyl acetate; polyalkylene oxides such as polyethylene oxide; polyethylene glycols; acrylamide; acrylic acid; cellulose, alkyl cellulosics such as methyl cellulose, ethyl cellulose and propyl cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides including starch, modified starch; gelatin; alginates; xyloglucans, other hemicellulosic polysaccharides including xylan, glucuronoxylan, arabinoxylan, mannan, glucomannan and galactoglucomannan; and natural gums such as pectin, xanthan, and carrageenan, locus bean, arabic, tragacanth; and combinations thereof.

Chelating Agent

The laundry treatment compositions can comprise chelating agents and/or crystal growth inhibitor. Suitable molecules include copper, iron and/or manganese chelating agents and mixtures thereof. Suitable molecules include hydroxamic acids, aminocarboxylates, aminophosphonates, succinates, salts thereof, and mixtures thereof. Non-limiting examples of suitable chelants for use herein include ethylenediaminetetracetates, N-(hydroxyethyl)ethylenediamintriacetates, nitrilotriacetates, ethylenediamine tetraproprionates, triethylenetetraaminehexacetates, diethylenetriamine-pentaacetates, ethanoldiglycines, ethylenediaminetetrakis (methylenephosphonates), diethylenetriamine penta(methylene phosphonic acid) (DTPMP), ethylenediamine disuccinate (EDDS), hydroxyethanedimethylenephosphonic acid (HEDP), methylglycinediacetic acid (MGDA), diethylenetriaminepentaacetic acid (DTPA), N,N-Dicarboxymethyl glutamic acid (GLDA) and salts thereof, and mixtures thereof. Other nonlimiting examples of chelants of use in the present invention are found in U.S. Pat. Nos. 7,445,644, 7,585,376, and US 2009/0176684A1. Other suitable chelating agents for use herein are the commercial DEQUEST series, and chelants from Monsanto, DuPont, and Nalco, Inc. Yet other suitable chelants include the pyridinyl N oxide type.

Fluorescent Brightener

The laundry treatment compositions can comprise fluorescent brightener. Commercial fluorescent brighteners suitable for the present disclosure can be classified into subgroups, including but not limited to: derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents.

The fluorescent brightener may be selected from the group consisting of disodium 4,4'-bis{[4-anilino-6-morpholino-s-triazin-2-yl]-amino}-2,2'-stilbenedisulfonate (brightener 15, commercially available under the tradename TINOPAL AMS-GX by BASF), disodium 4,4'-bis{[4-anilino-6-(N-2-bis-hydroxyethyl)-s-triazine-2-yl]-amino}-2,2'-stilbenedisulonate (commercially available under the tradename TINOPAL UNPA-GX by BASF), disodium 4,4'-bis{[4-anilino-6-(N-2-hydroxyethyl-N-methylamino)-s-triazine-2-yl]-amino}-2,2'-stilbenedisulfonate (commercially available under the tradename TINOPAL 5BM-GX by BASF). More preferably, the fluorescent brightener is disodium 4,4'-bis{[4-anilino-6-morpholino-s-triazin-2-yl]-amino}-2,2'-stilbenedisulfonate or 2,2'-([1,1'-Biphenyl]-4,4'-diyldi-2,1-ethenediyl)bis-benzenesulfonic acid disodium salt. The brighteners may be added in particulate form or as a premix with a suitable solvent, for example nonionic surfactant, propanediol.

Solvents

The laundry treatment compositions can comprise solvent. The solvent system in the laundry treatment compositions can be a solvent system containing water alone or mixtures of organic solvents either without or optionally with water. The compositions may optionally comprise an organic solvent. Suitable organic solvents include $C_{4-14}$ ethers and diethers, glycols, alkoxylated glycols, $C_6$-$C_{16}$ glycol ethers, alkoxylated aromatic alcohols, aromatic alcohols, aliphatic branched alcohols, alkoxylated aliphatic branched alcohols, alkoxylated linear $C_1$-$C_5$ alcohols, linear $C_1$-$C_5$ alcohols, amines, $C_8$-$C_{14}$ alkyl and cycloalkyl hydrocarbons and halohydrocarbons, and mixtures thereof. Optional organic solvents include 1,2-propanediol, 2,3 butane diol, ethanol, glycerol, ethoxylated glycerol, dipropylene glycol, methyl propane diol and mixtures thereof 2 ethyl hexanol, 3,5,5, trimethyl-1 hexanol, and 2 propyl heptanol. Solvents may be a polyethylene or polypropylene glycol ether of glycerin. Other lower alcohols, C1-C4 alkanolamines such as monoethanolamine and triethanolamine, can also be used. Solvent systems can be absent, for example from anhydrous solid embodiments of the invention, but more typically are present at levels in the range of from about 0.1% to about 98%, preferably at least about 1% to about 50%, more usually from about 5% to about 25%, alternatively from about 1% to about 10% by weight of the laundry treatment composition of said organic solvent. These organic solvents may be used in conjunction with water, or they may be used without water.

Combinations

An example is below:

A. A laundry treatment cartridge (1) comprising:
  - a first sub-container (10) containing a first laundry treatment composition (13) comprising:
  - from about 20 wt % to about 30 wt % of a first anionic surfactant system; and
  - from about 13 wt % to about 23 wt % of a first nonionic surfactant system; and
  - a second sub-container (20) containing a second laundry treatment composition (23) comprising:
  - from about 0.001 wt % to about 0.3 wt % enzyme; and
  - from about 1 wt % to about 3 wt % soil release polymer;
  - wherein said first sub-container and said second sub-container are positioned within said cartridge.

B. The laundry treatment cartridge according to Paragraph A, wherein said first sub-container comprises a first sub-container outlet (14), wherein said second sub-container comprises a second sub-container outlet (24), and wherein said first sub-container outlet and said second sub-container outlet are oriented in the same direction and spaced apart from one another.

C. The laundry treatment cartridge according to Paragraph A or B, wherein said first sub-container outlet and said second sub-container outlet each comprise an outlet valve (51).

D. The laundry treatment cartridge according to any of Paragraphs A to C, wherein said first sub-container and said second sub-container are each a collapsible bag (50).

E. The laundry treatment cartridge according to any of Paragraphs A to D, wherein said first laundry treatment composition further comprises from about 1 wt % to about 3 wt % of a first amine oxide system, wherein said second laundry treatment composition further comprises from about 1 wt % to about 3 wt % a second amine oxide system.

F. The laundry treatment cartridge according to any of Paragraphs A to E, wherein at least one of said first laundry treatment composition and said second laundry treatment composition further comprises at least one of from about 1 wt % to about 3 wt % chelant, from about 1 wt % to about 3 wt % organic acid, from about 1 wt % to about 2 wt % boron compound, from about 0.0025 to about 0.0075 wt % amylase, from about 0.02 wt % to about 0.05 wt % protease, from about 0.2 wt % to about 0.3 wt % brightener, and mixtures thereof.

G. The laundry treatment cartridge according to any of Paragraphs A to F, wherein said second laundry treatment composition further comprises a constituent selected from about 1 wt % to about 3 wt % chelant, from about 1 wt % to about 3 wt % organic acid, from about 1.5 wt % to about 3 wt % boron compound, from about 0.1 wt % to about 0.5 wt % alkoxylated polyamine, from about 0.2 wt % to about 0.3 wt % brightener, hueing dye, and combinations thereof.

H. The laundry treatment composition according to any of Paragraphs A to G, wherein said enzyme comprises from about 0.01 wt % to about 0.025 wt % amylase, from about 0.1 wt % to about 0.3 wt % protease, from about 0.0005 wt % to about 0.01 wt % mannanase and from about 0.0005 to about 0.01 pectinase, and combinations thereof.

I. The laundry treatment cartridge according to any of Paragraphs A to H, wherein said first laundry treatment composition has a lower weight fraction of enzyme than said second laundry treatment composition.

J. The laundry treatment cartridge according to any of Paragraphs A to I, wherein said laundry treatment cartridge further comprises:

a third sub-container (30) containing a third laundry treatment composition (33) comprising from 8 wt % to about 20 wt % phthalimidoperoxycaproic acid; and from 0 wt % to 0.05 wt % hydrochloric acid or equivalent.

K. The laundry treatment cartridge according to Paragraph J, wherein said third sub-container comprises a third sub-container outlet (34), wherein said first sub-container outlet, said second sub-container outlet, and said third sub-container outlet are oriented in the same direction and spaced apart from one another.

L. The laundry treatment cartridge according to Paragraph J or K, wherein said third sub-container comprises an outlet valve (51).

M. The laundry treatment cartridge according to any of Paragraphs J to L, wherein said third container is a collapsible bag (50).

N. The laundry treatment cartridge according to any of Paragraphs J to M, wherein said first sub-container contains a first volume of said first laundry treatment composition, said second sub-container contains a second volume of said second laundry treatment composition, and said third sub-container contains a third volume of said third laundry treatment composition, wherein said third volume is less than said first volume and said second volume.

O. The laundry treatment cartridge according to Paragraph N, wherein said third volume is less than about 60% of said first volume and said second volume.

P. The laundry treatment cartridge according to Paragraph N or O, wherein said first volume is from about 300 to about 900 mL, said second volume is from about 300 mL to about 900 mL, and said third volume is from about 100 mL to about 400 mL.

Q. The laundry treatment composition according to any of Paragraphs A to P, wherein said second laundry treatment composition further comprises:

from about 20 wt % to about 30 wt % a second anionic surfactant system;

from about 13 wt % to about 23 wt % a second nonionic surfactant system; and from about 1 wt % to about 3 wt % a second amine oxide system.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

What is claimed is:

1. A laundry treatment cartridge comprising:

a first sub-container containing a first laundry treatment composition comprising:

from 20 wt % to 30 wt % of a first anionic surfactant system; and from 13 wt % to 23 wt % of a first nonionic surfactant system; and a second sub-container containing a second laundry treatment composition comprising:

from 0.001 wt % to 0.3 wt % enzyme; and from 1 wt % to 3 wt % soil release polymer;

wherein said first sub-container and said second sub-container are positioned within said cartridge;

wherein said laundry treatment cartridge further comprises a third sub-container containing a third laundry treatment composition comprising from 8 wt % to 20 wt % phthalimidoperoxycaproic acid; and from 0.025 wt % to 0.05 wt % hydrochloric acid.

2. The laundry treatment cartridge according to claim 1, wherein said first sub-container comprises a first sub-container outlet, wherein said second sub-container comprises a second sub-container outlet, and wherein said first sub-container outlet and said second sub-container outlet are oriented in the same direction and spaced apart from one another.

3. The laundry treatment cartridge according to claim 2, wherein said first sub-container outlet and said second sub-container outlet each comprise an outlet valve.

4. The laundry treatment cartridge according to claim 2, wherein said first sub-container and said second sub-container are each a collapsible bag.

5. The laundry treatment cartridge according to claim 1, wherein said first sub-container and said second sub-container are each a collapsible bag.

6. The laundry treatment cartridge according to claim 1, wherein said first laundry treatment composition further comprises from 1 wt % to 3 wt % of a first amine oxide system, wherein said second laundry treatment composition further comprises from 1 wt % to 3 wt % a second amine oxide system.

7. The laundry treatment cartridge according to claim 1, wherein at least one of said first laundry treatment composition and said second laundry treatment composition further comprises at least one of from 1 wt % to 3 wt % chelant, from 1 wt % to 3 wt % organic acid, from 1 wt % to 2 wt % boron compound, from 0.0025 to 0.0075 wt % amylase, from 0.02 wt % to 0.05 wt % protease, from 0.2 wt % to 0.3 wt % brightener, and mixtures thereof.

8. The laundry treatment cartridge according claim 7, wherein said second laundry treatment composition further comprises a constituent selected from 1 wt % to 3 wt % chelant, from 1 wt % to 3 wt % organic acid, from 1.5 wt % to 3 wt % boron compound, from 0.1 wt % to 0.5 wt % alkoxylated polyamine, from 0.2 wt % to 0.3 wt % brightener, hueing dye, and mixtures thereof.

9. The laundry treatment cartridge according claim 1, wherein said second laundry treatment composition further comprises a constituent selected from 1 wt % to 3 wt % chelant, from 1 wt % to 3 wt % organic acid, from 1.5 wt % to 3 wt % boron compound, from 0.1 wt % to 0.5 wt % alkoxylated polyamine, from 0.2 wt % to 0.3 wt % brightener, hueing dye, and combinations thereof.

10. The laundry treatment composition according to claim 1, wherein said enzyme comprises from 0.01 wt % to 0.025 wt % amylase, from 0.1 wt % to 0.3 wt % protease, from 0.0005 wt % to 0.01 wt % mannanase and from 0.0005 to 0.01 pectinase, and combinations thereof.

11. The laundry treatment cartridge according to claim 1, wherein said first laundry treatment composition has a lower weight fraction of enzyme than said second laundry treatment composition.

12. The laundry treatment cartridge according to claim 1, wherein said third sub-container comprises a third sub-container outlet, wherein said first sub-container outlet, said second sub-container outlet, and said third sub-container outlet are oriented in the same direction and spaced apart from one another.

13. The laundry treatment cartridge according to claim 1, wherein said third sub-container comprises an outlet valve.

14. The laundry treatment cartridge according to claim 1, wherein said first sub-container, said second sub-container, and said third container is a collapsible bag.

15. The laundry treatment cartridge according to claim 1, wherein said first sub-container contains a first volume of said first laundry treatment composition, said second sub-container contains a second volume of said second laundry treatment composition, and said third sub-container contains a third volume of said third laundry treatment composition, wherein said third volume is less than said first volume and said second volume.

16. The laundry treatment cartridge according to claim 15, wherein said third volume is less than 60% of said first volume and said second volume.

* * * * *